(12) United States Patent
Ellingsen et al.

(10) Patent No.: US 11,781,401 B2
(45) Date of Patent: Oct. 10, 2023

(54) TIE-IN OF SUBSEA PIPELINE

(71) Applicant: Equinor Energy AS, Stavanger (NO)

(72) Inventors: Kjell Einar Ellingsen, Tananger (NO); Bjørgulf Haukelidsæter Eidesen, Stavanger (NO); Kristoffer Dahl, Stavanger (NO)

(73) Assignee: Equinor Energy AS, Stavanger (NO)

( * ) Notice: Subject to any disclaimer, the term of this patent is extended or adjusted under 35 U.S.C. 154(b) by 5 days.

(21) Appl. No.: 17/314,798

(22) Filed: May 7, 2021

(65) Prior Publication Data

US 2021/0262322 A1 Aug. 26, 2021

Related U.S. Application Data

(62) Division of application No. 16/470,063, filed as application No. PCT/NO2017/050331 on Dec. 18, 2017, now Pat. No. 11,041,372.

(30) Foreign Application Priority Data

Dec. 16, 2016 (GB) ...................................... 1621525
Aug. 21, 2017 (GB) ...................................... 1713414

(51) Int. Cl.
*E21B 43/01* (2006.01)
*F16L 1/26* (2006.01)
(Continued)

(52) U.S. Cl.
CPC .............. *E21B 43/013* (2013.01); *F16L 1/26* (2013.01); *E21B 33/035* (2013.01)

(58) Field of Classification Search
CPC combination set(s) only.
See application file for complete search history.

(56) References Cited

U.S. PATENT DOCUMENTS 4,230,186 A * 10/1980 Lewis, Jr. ............... E21B 23/12
 175/7
4,615,646 A 10/1986 Langner
(Continued)

FOREIGN PATENT DOCUMENTS

CN 1228826 A 9/1999
CN 202100243 U 1/2012
(Continued)

OTHER PUBLICATIONS

Mar. 1, 2018—(WO) International Search Report and Written Opinion—App PCT/NO2017/050331.
(Continued)

*Primary Examiner* — Kyle Armstrong
(74) *Attorney, Agent, or Firm* — Banner & Witcoff, Ltd.

(57) ABSTRACT

A method of installing a header pipe joint 1 at a subsea structure 5 is provided, comprising providing a header pipe joint 1 having at least one valve 2 installed therein and connecting the header pipe joint 1 inline of a spool 15 or pipeline 18 prior to lowering the header pipe joint 1 to the subsea structure 5. The header pipe joint 1 is then lowered to the subsea structure 5, and the valve 2 is connected to the subsea structure (e.g. a subsea production system of the subsea structure such as a xmas tree) with a connection bridge e.g. a choke bridge 14. This provides a fluidic connection between the subsea structure and the header pipe joint. The subsea structure 5 comprises a foundation, e.g. suction anchors 11, which provide support for both a wellhead and the header pipe joint. A subsea assembly comprising a subsea structure 5, header pipe joint 1 and connection bridge 14 is also provided.

19 Claims, 20 Drawing Sheets

(51) Int. Cl.
*E21B 43/013* (2006.01)
*E21B 33/035* (2006.01)

(56) References Cited

U.S. PATENT DOCUMENTS

| | | |
|---|---|---|
| 4,629,003 A | 12/1986 | Baugh |
| 6,142,708 A | 11/2000 | Tarlton et al. |
| 6,148,921 A | 11/2000 | Valla et al. |
| 6,435,771 B1 | 8/2002 | Baugh |
| 6,481,504 B1 | 11/2002 | Gatherar |
| 7,093,661 B2 | 8/2006 | Olsen |
| 7,793,724 B2 | 9/2010 | Daniel et al. |
| 2008/0014026 A1 | 1/2008 | Routeau et al. |
| 2008/0135256 A1 | 6/2008 | Daniel et al. |
| 2009/0288836 A1 | 11/2009 | Goodall et al. |
| 2011/0061871 A1* | 3/2011 | Omvik ............ E21B 43/013 166/360 |
| 2012/0125688 A1 | 5/2012 | Noble et al. |
| 2013/0277060 A1 | 10/2013 | Critsinelis et al. |
| 2016/0169414 A1* | 6/2016 | Ayestaran Basagoitia ............ F16L 1/123 405/173 |
| 2020/0332628 A1 | 10/2020 | de Araujo Bernardo et al. |
| 2021/0079763 A1 | 3/2021 | Ali et al. |

FOREIGN PATENT DOCUMENTS

| | | |
|---|---|---|
| CN | 102498258 A | 6/2012 |
| CN | 103711460 A | 4/2014 |
| CN | 103911460 A | 7/2014 |
| EP | 1266123 A1 | 12/2002 |
| GB | 1071155 A | 6/1967 |
| GB | 2549102 A | 10/2017 |
| GB | 2564138 A | 1/2019 |
| WO | 9105938 A1 | 5/1991 |
| WO | 2011110950 A2 | 9/2011 |
| WO | 2013/037002 A1 | 3/2013 |
| WO | 2015149843 A1 | 10/2015 |
| WO | 2017155415 A1 | 9/2017 |
| WO | 2017179992 A1 | 10/2017 |
| WO | 2017179993 A1 | 10/2017 |
| WO | 2018045357 A1 | 3/2018 |
| WO | 2018056834 A1 | 3/2018 |
| WO | 2019008435 A1 | 1/2019 |

OTHER PUBLICATIONS

May 11, 2017—(GB) Search Report—APP 1621525.3.
Jan. 30, 2018—(IPO) Combined Search and Examination Report—Appln No. GB1713414.9.
Per R. Nystrøm et al., Lay Method to Allow for Direct Tie-in of Pipelines, International Society of Offshore and Polar Engineers, presented at the Twenty-fifth International Ocean and Polar Engineering Conference, Jun. 21-26, 2015, Kona, Hawaii, USA.
Nov. 17 and 26, 2021—(CN) Combined Search Report and Office Action—Appln No. 2017800866487.

* cited by examiner

TIE-IN OF SUBSEA PIPELINE

This Application is a U.S. Divisional Patent application claiming the benefit of priority to U.S. patent application Ser. No. 16/470,063, filed on Jun. 14, 2019, which claims the benefit of priority as a U.S. national stage filing of PCT Application No. PCT/NO2017/050331, filed on Dec. 18, 2017, which claims the benefit of priority to both GB Patent Application No. 1713414.9, filed on Aug. 21, 2017 in the United Kingdom and GB Patent Application No. 1621525.3, filed on Dec. 16, 2016 in the United Kingdom; all of the aforementioned patent applications are herein incorporated by reference in their entireties.

The invention relates to methods for the tie-in of a subsea pipeline to a subsea structure and subsea systems in which a subsea pipeline is tied-in to a subsea structure. The subsea pipelines may in particular be hydrocarbon pipelines used in the oil and gas industry. The invention particularly relates to methods of installing header pipe joints, subsea assemblies, methods of installing manifolds and subsea installations.

Pipelines for an oil and gas subsea installation, such as those used for the transport of hydrocarbons, e.g. oil or gas, are typically laid along the seabed between subsea structures using a laying vessel. Each subsea structure will typically comprise one or more "Xmas trees" (or riser bases or Blow-Out Preventers (BOPs)) each mounted on a well head, with a manifold typically provided between the Xmas trees and the pipeline.

Often, one or both ends of the pipeline are connected (or "tied-in") to a manifold of the subsea structure using a separate jumper or spool. Existing subsea manifolds are generally designed for four well heads and weigh typically 150-200 tons. The spools may be rigid or flexible and are designed to take up installation tolerances, tie-in forces and pipeline expansion.

Direct tie-in methods (without a jumper or spool) can also be used. These methods include:

Direct pull-in, in which an end of the pipeline is pulled close to the subsea structure using a winch location on the laying vessel, and the tie-in is completed using a remotely operated vehicle (ROV) and alignment apparatus;

Deflect to connect, wherein the pipe is pulled to a target area in line with the platform but to one side of it, then the connection is made by winding or otherwise deflecting the pipe laterally until it mates with the riser connection; and Connect and lay-away, in which the subsea end of the pipeline is connected to the subsea structure at the surface, and the subsea structure is then lowered to the seabed before the laying vessel lays the pipeline by stepping away from the subsea structure.

However, all of these methods of connecting a pipeline to a subsea facility require considerable time, effort and cost, with many underwater connections to be made. The extra components and procedures associated with the use of separate jumpers or spools in particular can result in high costs for the installation process. For example, a number of lifting procedures may be required where a spool is used: firstly, a lift to install the foundation structure. Secondly, a lift to install the manifold and thirdly, a lift to install the spool. The spool then needs to be connected to the manifold by an ROV connection process.

The present invention aims to address these problems.

According to a first aspect, the present invention provides a method of installing a header pipe joint at a subsea structure, comprising: providing a header pipe joint having at least one valve installed therein; connecting the header pipe joint inline of a spool or pipeline prior to lowering the header pipe joint to the subsea structure; lowering the header pipe joint to the subsea structure; and connecting the valve to the subsea structure with a connection bridge to provide fluidic connection between the subsea structure and the header pipe joint.

According to another aspect, the present invention provides a method of installing a header pipe joint at a subsea structure, comprising: providing a header pipe joint having at least one valve installed therein; connecting the header pipe joint inline of a spool or pipeline prior to lowering the header pipe joint to the subsea structure; lowering the header pipe joint to the subsea structure; connecting the valve to the subsea structure with a connection bridge to provide fluidic connection between the subsea structure and the header pipe joint; wherein the subsea structure comprises a foundation which provides support for both a wellhead and the header pipe joint.

As described above, the methods comprise lowering the header pipe joint to the subsea structure and connecting the valve to the subsea structure. Therefore, it will be appreciated that inherently the lowering step includes the header pipe joint being received at the structure. However, for the avoidance of doubt, it could alternatively be stated that the methods comprise receiving the header pipe joint at the subsea structure, which may be considered as part of the lowering step or as a further step after the lowering step.

The header pipe joint may be lowered onto (i.e. received onto) or lowered into (i.e. received into) the subsea structure. It may be supported on or supported in the structure.

It will be appreciated that by connecting a header pipe joint "inline" of a spool or pipeline typically means to connect it to a spool or pipeline to form a continuous conduit with the spool or pipeline. In other words, the header pipe joint is in the line of the spool or pipeline. This includes connecting it in between portions of the spool or pipeline or in between two spools to form a continuous conduit with the spool(s) or pipeline. In other words, one end of the header pipe joint is connected to one spool (may also be termed a spool piece) or pipeline section and the other end of the header pipe joint is connected to another spool or pipeline section, so as to form a continuous conduit therewith. In this situation, the subsea structure may be an intermediate structure within a chain of subsea structures.

Connecting the header pipe joint inline of a spool or pipeline also includes connecting it at only one end to a spool or pipeline, so as to be inline with only that spool or pipeline, with the other end being closed off. In this situation, the subsea structure in which the header pipe joint is installed may be an end structure in a chain of structures.

In some embodiments, the header pipe joint may be connected at only one longitudinal end to a spool or pipeline prior to lowering the header pipe joint to the subsea structure, and then once the header pipe joint is received at the subsea structure, the other end of the header pipe joint is connected to a spool or pipeline subsea. In such embodiments, during the step of lowering the header pipe joint to the subsea structure, the end of the header pipe joint that is not connected to a spool or pipeline may be connected to a guidance wire which assists with guiding the header pipe joint to the correct location. Then, once the header pipe joint is in place, the guidance wire is removed and the end of the header pipe joint to which the guidance wire was connected is connected to a spool or pipeline.

It will be readily understood that a header pipe joint is a section of pipe with a valve installed therein, which is used to connect a subsea spool or pipeline to a subsea structure. It will typically be a 12 m length pipe section (or a 12 m "pipe joint assembly").

It will be appreciated that the valve installed in the header pipe joint may be considered as an inline valve.

The header pipe joint may also be considered as an inline valve manifold. Preferably, the pipeline of the various aspects and embodiments of the invention described herein is a rigid pipeline. Rigid pipelines are extremely well known in the art. Although such pipelines are known as rigid pipelines, and are designed to be substantially rigid, particularly in relation to the forces typically incident on them during use, the skilled person would well appreciate that they are not necessarily entirely rigid. They will generally have a small amount of elastic flexibility, so that they can flex a small amount, but if pushed to flex beyond this then the pipeline would be damaged, e.g. kink or fracture. In fact, some "rigid" pipelines with a small enough diameter may actually be able to be coiled up on a drum for laying, though it would need to be straightened out afterwards. The flexibility present in such rigid pipelines would generally allow some sagging of the pipeline during the laying process. Rigid pipelines normally comprise a metal pipe surrounded by a layer of insulation. Such pipelines are discussed later with reference to the drawings.

Rigid pipelines are considerably different to "flexible pipelines" as known in the art. Such flexible pipelines are designed to have flexibility incorporated therein, generally by means of comprising a series of flexible layers bonded together.

Rigid pipelines are less complex and much less expensive to manufacture than flexible pipelines. They are stronger and more robust than flexible pipeline, and more resistant to ageing temperature and pressure. They have less leak points. They can be made in pipe sections, typically a standard 12 m pipe section, which can then be connected together to form the required length of pipeline. Such rigid pipelines are thus highly preferred in embodiments of the present invention.

The subsea structure having the header pipe joint installed thereat may be termed a subsea assembly.

The methods of the aspects of the invention described above may be used as part of a tie-in process for a pipeline, and provide significant advantages over prior art tie-in methods. As discussed above, existing tie-in methods are time consuming and costly, involving a number of lifting procedures and many underwater connections to be made.

However, in the present invention, by connecting a header pipe joint having a valve installed therein inline of a spool or pipeline prior to lowering the header pipe joint (and thus the spool or pipeline with which it is inline) at a subsea structure, the number of connections and components required to connect a pipeline to the subsea structure are considerably reduced.

The valve in the header pipe joint enables direct fluidic connection via a connection bridge between the header pipe joint (and thus a spool/pipeline connected thereto) and the subsea structure (e.g. an xmas tree of the subsea structure, as will be discussed later). As the skilled person will appreciate, this allows much of the pipework and many of the components in prior art structures to be omitted. The header pipe joint essentially functions as an inline valve manifold.

Whilst it is necessary to install the valve in the header pipe joint, and connect the header pipe joint inline of the spool or pipeline, this is done above the surface e.g. on a lay vessel, prior to lowering of the header pipe joint under the sea, and as such is not an onerous task. The valve is typically welded or bolted into the header pipe joint. The valve will generally be located according to a pre-determined hook-up point, e.g. a wing connection hub, on the production system e.g. xmas tree. It will be appreciated that the valve will have a connector for connecting to the connection bridge.

Consequently, the operational time of the installation vessel is reduced and so there can be an improved marine operation schedule. Cost is reduced. The reduced number of components means less leak points. Since there is less pipework, flow is improved (particularly in gas fields) and pressure drop is reduced. Moreover, fewer connections and integrated pipework means less hydraulic power and communications connections are needed.

Essentially, overall, the number of connections and components required to connect a pipeline to a production system are considerably less in the invention than in prior art systems.

It will be appreciated that where the header pipe joint is connected inline of a pipeline, this is a simpler solution than the case where the header pipe joint is connected inline of a spool (and thus a further connection between the spool and pipeline is required for tie-in of a pipeline). However, the installation of a header pipe joint inline with a pipeline is more complex than the installation of a header pipe joint inline with a spool, due to the need in the former case to lay the pipeline into the structure and align it correctly for the connection to be made with the connection bridge. Thus, the spool with inline header pipe joint, or pipeline with inline header pipe joint solution may be chosen depending on whether simplified components or simplified installation is more important in the given situation.

Furthermore, the pipeline size will affect which solution is preferred in a particular application. A pipeline with inline header pipe joint will work better for small diameter pipelines. When the pipeline diameter is large, e.g. 18 inches (45 cm), it is more difficult to correctly position the pipeline in the structure. However, the spool with inline header pipe joint solution can be used with large pipelines so may be preferable in that scenario.

It will be appreciated that "lowering the header pipe joint to the subsea structure" means the process of deploying the header pipe joint under the sea at the subsea structure, as is known in the art.

Typically, the header pipe joint will be lowered from an installation vessel. When the header pipe joint is inline of a spool, the step of lowering the header pipe joint to the subsea structure may be a lifting procedure performed e.g. by a construction vessel. When the header pipe joint is inline of a pipeline the step of lowering the header pipe joint to the subsea structure may be a laying procedure performed e.g. by a laying vessel. (The term "installation vessel" includes both construction and laying vessels). Since the header pipe joint is connected inline of a spool or pipeline, the step of lowering the header pipe joint to the structure will inherently include lowering the spool or pipeline to the structure too.

By having a foundation that supports both a wellhead and the header pipe joint, all components associated with the well head can be provided at the same location, thus avoiding the complexity associated with components distributed across various structures. Furthermore, by both the well head and the header pipe joint being supported by the same foundation, this enables relative movement of both the wellhead and header pipe joint to be minimised. Thus, connections (including indirect connections e.g. via a production system mounted on the wellhead) between the two are simplified since flexible piping does not need to be provided.

The foundation may typically be a suction anchor, however other foundations could be used such as a mudmat or a piled arrangement.

The header pipe joint is preferably locked to the subsea structure. The subsea structure preferably comprises a support structure, such a support frame. The method may then comprise installing the header pipe joint into or onto the support structure, and preferably locking it to the support structure. It will be appreciated that "locking" means to attach or fix the header pipe joint, such that relative movement between the header pipe joint and the subsea structure/support structure is prevented. By locking to the subsea structure/support structure, any forces acting on the header pipe joint e.g. due to thermal expansion of the spool/pipeline with which it is inline, will be absorbed by the structure to which it is locked.

The connection bridge may be for example a spool piece, jumper or choke bridge. Such connection bridges are well known to the skilled person. The connection bridge will generally be installed using a lifting process in which the bridge is lowered subsea e.g. by a drilling rig or construction vessel. A choke bridge may preferably be a rigid choke bridge. It will be appreciated that by "rigid" is meant rigid relative to the normal (i.e. typical) forces to be exerted on it during normal operation.

The support structure may be mounted on the foundation, e.g. the suction anchor or mudmat. It may be directly mounted on the foundation, or indirectly mounted e.g. via a well head supported by a suction anchor. So, for example, a suction anchor foundation may have a well head supported thereon, with the support structure being mounted on the well head.

Most preferably, the foundation is pre-installed at the seabed prior to the step of lowering the header pipe joint to the subsea structure. Thus, the foundation is installed and the support structure is installed on the foundation. The header pipe joint is then installed into the support structure. This will be the case in the context of the applicant's Cap-X technology (as described later).

The foundation provides support for a wellhead. Thus, preferably, the subsea structure comprises a wellhead.

In embodiments, the subsea structure may comprise two foundations e.g. suction anchors, each foundation supporting a different wellhead. The two foundations may both support the header pipe joint. A support structure may be mounted on the two foundations, into which the header pipe joint is installed.

The subsea structure will typically comprise a subsea production system providing a hydrocarbon fluid source, such as an xmas tree, riser base, pump or compressor station. The production system may be mounted on the well head.

The purpose of connecting the valve in the header pipe joint to the subsea structure is to provide fluidic connection between the subsea structure and the header pipe joint, thus preferably the valve is connected via the connection bridge to the xmas tree, riser base, pump or compressor station of the subsea structure.

Most preferably, the connection bridge provides a direct connection between the valve and the xmas tree/riser base/pump/compressor station, i.e. with no intervening components. Thus, much of the pipework and other components associated with existing structures are unnecessary.

In one preferred embodiment, particularly where the structure comprises two foundations each supporting a different wellhead, the header pipe joint comprises two valves. The method then includes connecting each of the two valves to the subsea structure with a connection bridge (one bridge for each valve). Generally, the number of valves will correspond to the number of subsea production systems such as xmas trees, riser bases, pumps or compressor stations at the subsea structure, with one valve being provided for each of these. Thus, two valves may be provided where there are two xmas trees, riser bases, pumps or compressor stations, with one valve being connected to each.

It will be appreciated that the valve(s) will have a connector for attaching to the connection bridge. The valve(s) will typically be bolted or welded into the header pipe joint.

In one embodiment, the header pipe joint has at least one ROV (remotely operated vehicle) operable distribution unit installed therein, such as a distribution box or panel, for the distribution of hydraulic fluid to the connection bridge. Generally, one such distribution box or panel will be provided for each valve. Preferably, a hydraulic line and a service line is provided between each distribution unit and its respective valve. Chemical and communication lines may also be provided at the distribution unit.

The distribution unit is preferably installed in the header pipe joint during manufacture of the header pipe joint. Thus, the header pipe joint having a distribution unit installed therein is supplied to the installation vessel as one unit and is connected inline of the spool or pipeline prior to lowering to the subsea structure. After the header pipe joint has been lowered at the subsea structure, the distribution unit is generally connected to lines on the seabed by jumper lines with stab connections, since this is the most efficient method.

The header pipe joint may have further features. For example, in the case that the header pipe joint is connected inline of a pipeline (and so may be used in a direct tie-in of a pipeline), the header pipe joint may further comprise an axial ram plate. In this case, the subsea structure will comprise an alignment frame. During the step of lowering the header pipe joint to the subsea structure, which in this case would comprise laying the header pipe joint at the subsea structure, the alignment frame provides lateral guiding of the pipeline and the pipeline is pulled into the subsea structure by a lay vessel until the ram plate abuts the alignment frame. Thus, the axial ram plate and alignment frame provide a means of alignment of the pipeline at the subsea structure.

This is important because the pipeline must be aligned so that when the connection bridges are lifted in place they are able to be connected to the valve on the header pipe joint and a connection point on the subsea structure. For example, a wing connection hub may be provided on an xmas tree at the subsea structure, and the header pipe joint will need to be aligned in the correct position relative to the wing connection hub so that the connection bridge can connect with both components.

In other alignment mechanisms, a male part may be provided on the header pipe joint, or the spool or pipeline with which it is inline, and a female part may be provided on the subsea structure (such as on a support structure of the subsea structure). The female part may for example comprise key slots. When the male part is located in the female part, the header pipe joint is correctly aligned, for example correctly aligned such that the valve can easily be connected to the structure with a connection bridge. Therefore the method may include aligning the male part with the female part and receiving the male part in the female part, such that the header pipe joint is aligned at the structure.

Concrete inflatable support bags, gravel bags and/or rock heaps/dumps may be provided forward and aft of the subsea structure to control the pitch angle of the header pipe joint inline with the pipeline as it is laid. Frame structures may also be used for this purpose.

Buoyancy elements may be utilised to provide stability during the installation of the header pipe joint. For example, buoyancy elements may be attached to the header pipe joint and/or the spool or pipeline with which the header pipe joint is inline.

An initiation wire, optionally in combination with a sheave located at the subsea structure, may be used during the method of installing the header pipe joint.

The subsea structure may further comprise a latching mechanism for locking the pipeline in the axial direction. After the pipeline is pulled into the subsea structure by the lay vessel until the ram plate abuts the alignment frame, the latching mechanism may be activated to lock the pipeline in the axial direction. It is important to latch the pipeline in place to avoid movement that could damage the connections with the subsea structure, which, in an extreme case, could lead to leaks.

Alternatively or additionally, in the case that the header pipe joint is connected inline of a pipeline, the header pipe joint may further comprise an anchor post. In this case, the subsea structure may also comprise an anchor post. After the header pipe joint is laid at the subsea structure, the yaw and roll of the pipeline may be adjusted by movement of the anchor post of the header pipe joint with respect to the anchor post of the subsea structure.

In embodiments, the header pipe joint may be provided with a frame structure. The frame structure may act to protect the header pipe joint against falling objects. Additionally or alternatively, it may act to support the valve(s) installed in the header pipe joint.

In one embodiment, the subsea structure comprises a carrier having a support for supporting at least a portion of the header pipe joint; wherein the method comprises locating the header pipe joint so that it is supported by the support.

The header pipe joint may comprise two lever arms (e.g. locking pins) and the support may comprise two openings, the method comprising locating a lever arm in each opening. Each opening in the support may comprise a slot. The two openings may be complementary to the two lever arms.

The lever arms are preferably arranged opposite each other around the circumference of the header pipe joint and each extends laterally (e.g. radially) from the header pipe joint. The lever arms may comprise and/or be pins, shafts or circumferential plates.

The method may further comprise locking the lever arms in the openings to thereby lock the header pipe joint to the support and thereby the carrier. Locking may comprise sliding a locking wedge over the top of one or each lever arm to hold it in place in the opening.

The method may comprise rotationally aligning the header pipe joint by pushing the lever arms to the bottom of the opening.

The header pipe joint may be supported on or in the support. The support may be a recess in the carrier. The support may comprise side portions. The support may comprise side portions and a base portion. The support may be of a complementary shape to the header pipe joint. For example, the support may be a semi-circular tubular shape, curved in a similar fashion to a header pipe joint. It may comprise a channel.

The carrier may also be termed a cradle.

In one embodiment, the carrier is locked (fixedly attached) to and/or relative to the subsea structure (and/or foundation on which the subsea structure is supported), so that there is no relative movement therebetween.

In another embodiment, predominantly in the case that the header pipe joint is inline of a pipeline, the subsea structure comprises a carrier support and the carrier is slidably received in and/or on the carrier support. In this case the method further comprises adjusting the axial position of the header pipe joint by sliding the carrier relative to the carrier support. Preferably, the carrier receives power to cause it to slide in the carrier support. After the axial position of the header pipe joint is adjusted, the method may comprise locking the carrier to the carrier support.

In the case that the carrier is slidable, it may alternatively be termed a "sledge".

The carrier can therefore be seen as providing an alternative method of alignment to that described above utilising the axial ram plate and alignment frame. Rotational alignment may be provided by means of locating the lever arms in the openings, whilst axial alignment is achieved by sliding.

When the carrier is locked to the structure, [e.g. in the case of a header pipe joint inline of a spool, the carrier may always generally be locked to the structure, or in the case of a header pipe joint inline of a pipeline the carrier may be locked to the carrier support (and thereby the structure) after axial alignment has been achieved,] it cannot move relative to the subsea structure. Consequently, the position of the valve(s) in the header pipe joint may be fixed relative to the subsea structure and thus can be connected to the subsea structure (e.g. attached via a choke bridge to a wing connection hub on an xmas tree) without risk of disconnection or damage due to relative movement which may occur should the header pipe joint not be locked in position relative to the structure to which it is being connected. This also means that rigid choke bridges are particularly suitable, since no flexibility needs to be incorporated to handle fluctuations in relative position which may occur should the header pipe joint not be fixed in place. This further means that flexible branch piping conventionally present at subsea well assemblies is not required, since flexibility is not needed.

Moreover, by locking the header pipe joint to the carrier, and locking the carrier to the structure, expansion forces acting on the header pipe joint due to thermal expansion of the spool/pipeline will be "taken", i.e. absorbed by the carrier and structure.

It will be appreciated that the header pipe joint may be connected inline of a spool or pipeline by any suitable known connection method, for example by welding or bolting. Typically, the header pipe joint is connected inline of a spool or pipeline on the installation vessel (e.g. construction or lay vessel) that will carry out the lowering process. Thus, the header pipe joint having the valve (and optionally the other features discussed above) installed therein maybe manufactured at a fabrication site, and supplied to the installation vessel. It is then connected inline of a spool or pipeline on the installation vessel, and subsequently lowered to the subsea structure.

The invention further extends to a method of connecting a subsea pipeline to a subsea structure, comprising installing a header pipe joint at the subsea structure according to the method discussed above. Where the header pipe joint is connected inline of a spool, the method further comprises connecting the spool to the subsea pipeline. Such connection to the subsea pipeline will typically be performed under the sea at the structure, in one of the various known manners of connecting a spool to a pipeline.

The invention further extends to a method of connecting a pipeline to a subsea structure, comprising installing a header pipe joint at the subsea structure according to the method discussed above, wherein the header pipe joint is connected inline of the subsea pipeline.

In embodiments in which the header pipe joint is inline of a spool, a L or Z-shaped spool will allow thermal expansion to be accommodated.

In another aspect, the present invention provides a subsea assembly comprising: a subsea structure; a header pipe joint installed at the subsea structure and having at least one valve installed therein, wherein the header pipe joint is connected inline of a spool or a pipeline; and a connection bridge connected between the valve and the subsea structure and thereby providing fluidic connection between the header pipe joint and the subsea structure.

In a further aspect, the present invention provides a subsea assembly comprising: a subsea structure comprising a well head; a header pipe joint installed at the subsea structure and having at least one valve installed therein, wherein the header pipe joint is connected inline of a spool or a pipeline; and a connection bridge connected between the valve and the subsea structure and thereby providing fluidic connection between the header pipe joint and the subsea structure; wherein the subsea structure comprises a foundation which provides support for both the wellhead and the header pipe joint.

This subsea assembly thus comprises features corresponding to the methods of the aspects of the invention described above. Consequently, the features and advantages described above in relation to the methods of the aspects of the invention described above are also applicable to subsea assemblies of the invention. Some of these preferred features are mentioned again here. The subsea assembly may also be termed a wellhead assembly.

The connection bridge may be for example a spool piece, jumper or choke bridge. Such connection bridges are well known in the art. However the connection bridge is preferably a choke bridge, most preferably a rigid choke bridge.

The foundation is preferably a suction anchor or mudmat. The subsea structure preferably comprises a support structure such as a support frame. Generally, the header pipe joint is installed in this support structure. It may be locked to the support structure.

The support structure may be mounted, either directly or indirectly, on the foundation. For example it may be mounted on the wellhead which is supported by the foundation e.g. the suction anchor.

The subsea structure will typically comprise a subsea production system providing a hydrocarbon fluid source, such as an xmas tree, riser base, pump or compressor station. The production system may be mounted on the well head.

The purpose of the connection between the valve and the subsea structure is to provide fluidic connection between the subsea structure and the header pipe joint, thus preferably the valve is connected via the connection bridge to the xmas tree, riser base, pump or compressor station at the subsea structure.

In one preferred embodiment, the header pipe joint comprises two valves and each valve is connected to the subsea structure with a connection bridge (one bridge for each valve). Generally, the number of valves will correspond to the number of subsea production systems such as xmas trees, riser bases, pumps or compressor stations, with one valve being provided for each of these. Thus, two valves may be provided where there are two xmas trees, riser bases, pumps or compressor stations, with one valve being connected to each. In one embodiment, the header pipe joint has at least one ROV (remotely operated vehicle) operable distribution unit (e.g. a box or panel) installed therein for the distribution of fluid to the connection bridge. Generally, one such distribution unit will be provided for each valve. Preferably, a hydraulic line and a service line is provided between each distribution box or panel and its respective valve. The or each distribution box or panel is preferably connected by jumper lines with stab connections to lines on the seabed.

The header pipe joint may have further features. For example, in the case that the header pipe joint is connected inline of a pipeline (and so may be used in a direct tie-in of a pipeline), the header pipe joint may further comprise an axial ram plate. In this case, the subsea structure, particularly a support structure such as a support frame, will comprise an alignment frame arranged to provide lateral guiding of the pipeline during laying of the pipeline at the subsea structure. When installed, the ram plate abuts the alignment frame.

The subsea structure, particularly a support frame of the subsea structure, may further comprise a latching mechanism for locking the pipeline in the axial direction.

Another preferred feature in the case that the header pipe joint is connected inline of a pipeline is that the header pipe joint further comprises an anchor post. In this case, the subsea structure, particularly a support frame of the subsea structure, may also comprise an anchor post. The yaw and roll of the pipeline is adjustable by movement of the anchor post of the header pipe joint with respect to the anchor post of the subsea structure.

As an alternative to the above described ram plate and alignment frame, the subsea structure, particularly a support frame of the subsea structure, may be provided with a carrier having a support for supporting at least a portion of the header pipe joint. The header pipe joint may be supported by, e.g. on or in, the support.

The header pipe joint may comprise two lever arms and the carrier may comprise two openings, with one lever arm being located in each opening. Each opening in the carrier may comprise a slot.

The lever arms are preferably arranged opposite each other around the circumference of the header pipe joint and extend laterally e.g. radially from the header pipe joint. In embodiments, the lever arms comprise pins or shafts. In other embodiments, the lever arms comprise a circumferential plate arrangement.

Preferably, the lever arms are locked in the openings such that the header pipe joint is locked to the carrier. This locking may be effected by a locking wedge located over the top of each lever arm to hold it in place in the opening. The locking wedge may push the lever arm to the bottom of the opening such that the header pipe joint is rotationally aligned.

When the header pipe joint is installed inline of a pipeline, the subsea structure may comprise a carrier support in which the carrier is slidably received. This enables the axial position of the header pipe joint, and thus the axial position of the pipeline in which it is inline of, to be adjusted by sliding the carrier.

Preferably, the carrier is powered to cause it to slide in the carrier support and enable easy positioning of the carrier and thus the header pipe joint held therein.

Generally, the carrier is lockable to the carrier support. So, after it has been slid to achieve the correct axial alignment, it may be locked in place.

When the carrier is axially slidable, it may alternatively be termed a "sledge".

It will be appreciated that the header pipe joint may be connected inline of a spool or pipeline by any suitable known connection, for example a welded or a bolted connection.

In the case that the header pipe joint is connected inline of a spool, the spool may be connected inline of a pipeline. The connection between the spool and the pipeline may be any known suitable means.

In embodiments of the methods and subsea assemblies described above, the subsea structure may comprise one, two or more well slots. In the case that the subsea structure comprises one well slot, the header pipe joint may be installed on a balcony of the subsea structure, to one side of the well slot. In the case that the subsea structure comprises two well slots, the header pipe joint may be installed between the two well slots.

In embodiments of the above aspects of the invention, the header pipe joint may be inline of one spool or one pipeline (one section of pipeline). In other words, it may be connected at one end to a spool or pipeline to form a continuous conduit therewith. At its other end, it may be closed off. In other embodiments, the header pipe joint is inline of two spools or two pipelines (two sections of pipeline). In other words, it may be connected in between two spools or two pipelines (or one spool and one pipeline), to form a continuous conduit with both spools or with both pipelines (or with the spool and the pipeline).

The subsea assemblies of embodiments of the invention may be used in a subsea system comprising a chain of subsea assemblies. Assemblies wherein the header pipe joint is inline of one spool or one pipeline, may form end assemblies. Assemblies wherein the header pipe joint is inline of two spools, two pipelines, or one spool and one pipeline may form intermediate assemblies in such systems, each assembly being connected in between two others.

In yet another aspect, the present invention provides a method of installing a manifold at a subsea structure, comprising: providing a manifold having a spool integrally connected therewith; lowering the manifold having the spool integrally connected therewith to the subsea structure; and fluidically connecting the manifold with the subsea structure to thereby provide a fluidic connection between the spool and the subsea structure.

In another aspect, the present invention provides a method of installing a manifold at a subsea structure, comprising: providing a manifold having a spool integrally connected therewith; lowering the manifold having the spool integrally connected therewith to the subsea structure; fluidically connecting the manifold with the subsea structure to thereby provide a fluidic connection between the spool and the subsea structure; and fluidically connecting the spool to a subsea pipeline to thereby provide a fluidic connection between the subsea structure and the subsea pipeline.

As mentioned above, prior art methods of pipeline tie-in where a spool is used typically require a number of lifting and underwater connection procedures. However, by integrating the spool with the manifold in the present invention, only one lift is required to install the manifold with integrated spool, rather than two separate lifts (one for each of the manifold and spool). Furthermore, with the present invention there is no requirement to connect the spool with the manifold underwater since this connection is performed above the surface prior to installation. For example, the manifold may be integrated with the spool during the manufacturing process, and supplied to the construction vessel like this. Or, the manifold and spool may be supplied separately and then integrated together on the construction vessel prior to lowering under the sea.

Consequently, the time and cost of installation is reduced, and since no underwater ROV process is required for connecting the spool with the manifold, less overall equipment is required.

The manifold may be integrally connected to the spool by any suitable known method, for example a welded connection or a flange. In one preferred embodiment a compact flange is used.

The spool may comprise one or two spool pieces, the or each spool piece being integrally connected to the manifold e.g., by a welded connection or flange, such as a compact flange. Generally, one spool piece will be provided on one side of the manifold, and the other spool piece on the other side of the manifold, so that each spool piece facilitates the connection of the manifold inline of, i.e. in the line of and forming a continuous conduit with, a pipeline.

Each spool piece may be simply considered as a spool. Therefore, a spool may be provided on one side of the manifold, and another spool provided on the other, so that the two spools facilitate the connection of the manifold inline of a pipeline.

In one embodiment, the manifold comprises a header pipe. In this case, the integral connection between the manifold and the spool will generally be an integral connection between the header pipe of the manifold and the spool. Thus, e.g. a compact flange may be between the header pipe and the spool.

The manifold may further comprise branch piping. At least one valve may be provided in the header pipe or branch piping. The header pipe and branch piping may be connected, e.g. by the valve, to thereby effect the fluidic connection between the manifold and the subsea structure, and thus the spool integrated with the manifold and the subsea structure.

Consequently, the step of fluidically connecting the manifold with the subsea structure may comprise connecting the branch piping with the subsea structure to thereby provide a fluidic connection between the spool and the subsea structure via the header pipe, valve and branch piping.

The subsea structure will typically comprise a subsea production system providing a hydrocarbon fluid source, such as an xmas tree, riser base, pump or compressor station, mounted for example on a well. The purpose of connecting the manifold with the subsea structure is to provide fluidic connection between the spool and the subsea structure. Thus, the step of fluidically connecting the manifold with the subsea structure generally comprises connecting branch piping of the manifold with the xmas tree, riser base, pump or compressor station.

Preferably, two valves are provided in the header pipe, one associated with each of two xmas trees/riser bases/pumps/compressor stations.

Preferably, the header pipe incorporates some flexibility to allow for thermal expansion of the pipeline. For example, it may incorporate flexibility in the portion between the valve and the connection with the spool.

The invention further extends to a method of connecting a subsea pipeline to a subsea structure, comprising installing a manifold at the subsea structure in accordance with the embodiments described above, and further comprising connecting the spool to the subsea pipeline. The spool may be connected to the pipeline by any means known in the art. For example, connectors may be provided on the pipeline and on each end of the spool, which are connected up by ROV.

In a further aspect, the invention provides a subsea assembly comprising a manifold having a spool integrally connected therewith, wherein the manifold is fluidically connected to the subsea structure to thereby provide a fluidic connection between the spool and the subsea structure.

In a still further aspect, the invention provides a subsea assembly comprising a manifold having a spool integrally connected therewith, wherein the manifold is fluidically connected to the subsea structure to thereby provide a fluidic connection between the spool and the subsea structure. The preferred features of the methods of installing a manifold at a subsea structure as discussed above are also applicable to these aspects of the invention.

In all of the above described aspects and embodiments, one or more cover portions may be provided over all or part of the subsea structure after the various components are installed at the structure; and/or a subsea assembly may comprise such portions. The cover portions may be made from glass fibre. They may also be termed "skirt" and "cap" portions.

All of the above described aspects and embodiments of the invention may have particular application in the present applicant's "Cap-X" technology. This subsea concept utilising suction anchor technology provides a more open subsea structure than prior structures. The installation of a connection bridge between the valve and the subsea structure according to the embodiments of the invention described above is more practical in the more open structure of Cap-X since the connection bridge can be more easily put in place without encumbrance from other pipework and components. Similarly, the installation of a manifold with integrated spool is also more practical in the open structure of Cap-X.

As discussed above, the use of a connection bridge to fluidically connect a header pipe joint to a subsea structure allows much of the pipework and many of the components in prior art structure to be omitted, which is particularly advantageous. Well growth due to thermal expansion is a well-known problem, in which for example wells can grow or sink by 0-100 mm or more. In order to avoid broken connections between the well (e.g. the xmas tree) and the pipeline/spool when the well grows/sinks, flexible branch piping is used between the well and the pipeline/spool. This accommodates the well growth. However, in order to accommodate the well growth adequately, the branch piping often has to be long, and as a result is heavy. This long, heavy, flexible branch piping is costly and complex. Moreover, such branch piping has an associated pressure drop and vibration issues. Furthermore, tolerances have to be provided at all the various interconnected systems to allow for the movement.

The omission of this expensive and complex flexible branch piping, and the use instead of a connection bridge, in embodiments of the present invention, is particularly relevant in the context of the applicant's own "Cap-X" technology. In this technology, a well head is mounted on (e.g. locked to and/or supported by) a suction anchor, which is fixed to the sea bed. The suction anchor rigidly locks the well head to the sea bed, and beams around the well head transfer forces to the ground. This arrests well growth, in other words, the well does not grow/sink as in prior art systems. Typically, up to 10 cm well growth may be absorbed in the Cap-X technology. Because well growth is arrested, the flexible branch piping of prior art systems can be omitted, and instead, connection bridges can be used to fluidically connect the pipeline/spool to the xmas tree. In particular, rigid connection bridges may be used, as mentioned previously.

This omission of legacy flexible branch (also called manifold) piping reduces cost and complexity, and avoids the significant pressure loss across such piping. The complete system is simplified.

Preferably, in embodiments of the invention, the subsea structure is fixed in position relative to the header pipe joint (inline of a pipeline/spool) to which it is connected. Or, to put it another way, the header pipe joint is locked (fixedly attached) to the subsea structure. This may be achieved using a carrier comprising a support for receiving the header pipe joint, as discussed above. By locking the header pipe joint to the subsea structure, flexible branch piping between the two is not needed and the use of e.g. choke bridges is facilitated. This is because when the header pipe joint is locked to the structure, and the structure is locked to the sea bed, these will not move by thermal expansion and in particular not move relative to each other. So, the valves in the header pipe joint do not move either, and thus a simple, possibly rigid connection between the valves and the structure (subsea production system) are viable.

The above described aspects and embodiments of the invention may be used in the context of a subsea structure having any number of well slots. For example, the structure may have a single well slot or two or more well slots. In the case that the subsea structure comprises one well slot, the header pipe joint may be installed on a balcony of the subsea structure to one side of the well slot. In the case that the subsea structure comprises two well slots, the header pipe joint may be installed between the two well slots. In other embodiments, in the case of two well slots, the header pipe joint may not be installed between the two well slots: it may still be installed on a balcony of the subsea structure. Therefore, the header pipe joint may be installed between well slots or on a balcony, as suitable for the particular subsea structure, regardless of the number of well slots.

The carrier described above may be considered as an invention in its own right, and thus, in another aspect, there is provided a subsea installation comprising a carrier configured to receive a header pipe joint connected inline of a pipeline or spool; wherein the carrier comprises a support for supporting at least a portion of the header pipe joint; wherein the support comprises two openings, each on opposite sides of the support, each opening being for receiving a lever arm connected to the header pipe joint.

In another aspect, there is provided a subsea installation comprising a carrier for receiving a header pipe joint connected inline of a pipeline or spool; wherein the carrier comprises a support for supporting at least a portion of the header pipe joint; wherein the support comprises two openings, each on opposite sides of the support, each opening being for receiving a lever arm connected to the header pipe joint. The carrier is for receiving a header pipe joint connected inline of a pipeline or a spool, thus is suitable for receiving a header pipe joint as described herein. This does not preclude it also being suitable for receiving other pipes, e.g. parts of pipelines or spools. Thus, in another aspect, there is provided a subsea installation comprising a carrier for receiving a pipe; wherein the carrier comprises a support for supporting at least a portion of the pipe; wherein the support comprises two openings, each on opposite sides of the support, each opening being for receiving a lever arm connected to the pipe. The pipe may be e.g. a subsea pipeline or section thereof. Where features of the subsea installation are described below, these are applicable to both aspects described above, and where header pipe joints are referred to below these may alternatively be understood simply as pipes.

The subsea installation may be a subsea structure as described previously, or it may be another type of subsea structure. The subsea installation may or may not include production equipment such as an xmas tree. It may comprise or be a suction anchor.

Each opening in the support may comprise a slot or a groove having an open end. The lever arms can then slide into the slot through the open end, and sit within the slot. Preferably the slot is shaped so as to complement the shape of the lever arms.

The support may comprise side portions. The support may comprise two side portions and a base portion. One of the openings may be provided in each side portion. The side portions may be side panels. The support may be of a complementary shape to the header pipe joint. For example, the support may be a semi-circular tubular shape, curved in a similar fashion to a header pipe joint. The support may be in the form of a channel. The support may be recess in the carrier.

The support may also be described as a cradle.

The support may comprise two plates extending upwardly from a base of the carrier, one plate arranged on each side of the carrier so that the header pipe joint can be received therebetween.

One of the openings may be provided in each plate. In one embodiment each opening is a slot with straight sides and a curved bottom.

Each plate also preferably comprises two guiding faces, each extending from the top of the base portion on either side of the opening. The guiding faces may each be triangularly shaped, with a straight edge extending at an angle from the top of a straight side of the slot to an apex. Thus, an obtuse angle may be formed between the straight side of the slot and the edge of the guiding face'. The obtuse angle is preferably at least 225° or more.

This angled edge of each guiding face acts as a guiding system for the lever arm of the header pipe joint. As the header pipe joint is lowered into the support, the angled edges "catch" the lever arms and guide them down into the slot.

Furthermore, the guiding faces preferably bend outwards from the base portion of each plate. In other words, they are at an angle to the base portion from which they extend. These angled guiding faces act as a guiding system for the header pipe joint. As the header pipe joint is laid into the support, the guiding faces can "catch" the header pipe joint once it comes near the support, and guide it into and towards the bottom of the support.

The reception of the lever arms in the openings locates the header pipe joint in the correct position in the support/carrier.

A locking mechanism may be provided for locking a header pipe joint to the support. For example, in the case of the above described support, such a locking mechanism may comprise a locking wedge configured to slide across each opening to thereby lock a lever arm received therein to the support. The wedges may be slid across each opening by means of a screw mechanism. Preferably each locking wedge is shaped so as to force each lever arm to the bottom of the opening. The lever arms are positioned on the header pipe joint so that when they are held at the bottom of the openings, the header pipe joint is correctly rotationally aligned within the support/carrier. Thus, by forcing the lever arms to the bottom of the openings, the header pipe joint is correctly rotationally aligned in terms of roll, pitch and yaw. Rotational alignment is important so that the valve in the header pipe joint is "upended", i.e. extends straight upwards, to enable connection with the choke bridge.

The carrier may be located on the installation in the correct lateral and vertical position, and thus once the header pipe joint is laid in the carrier, it is correctly aligned in terms of sway and heave. In one embodiment, the carrier is also located in the correct axial position, so that a header pipe joint installed therein is correctly aligned in terms of surge.

In one embodiment, the carrier is locked to the structure so that it cannot move relatively thereto.

In another embodiment, the subsea installation comprises a carrier support and the carrier is slidably received in the carrier support such that the carrier is slidable back and forth to facilitate axial alignment of a header pipe joint installed therein. In this case the carrier may be termed a "sledge". The carrier support may comprise rails. The rails may be circular or square. There may be one or two rails, or three, or more. The rails may be below, next to or above (on each side of) the sledge. Therefore the sledge may be similar to a train car on rails. The sledge can have different geometries. It may be retrievable or non-retrievable.

A locking mechanism may be provided which is configured to lock the carrier to the carrier support after axial alignment has been achieved. The carrier may preferably be powered to cause it to slide within the carrier support. It will be appreciated that this "carrier support" is something which supports the carrier, which is different to the "support" that the carrier comprises, which is for supporting a header pipe joint. The carrier support may alternatively be termed a carrier guide.

In one embodiment, the carrier further comprises a second support, for supporting at least a portion of a second header pipe joint. The second support may have any of the features of the existing support, for example it may comprise two openings, each on opposite sides thereof, each opening being for receiving a lever arm connected to the second header pipe joint. Further supports may be provided for further header pipe joints.

In one embodiment the subsea installation may comprise two carriers, each carrier having any of the above described features. One carrier comprises a support for receiving a first header pipe joint, the other carrier comprises a support for receiving a second header pipe joint. The carriers may be axially slidable relative to each other so that the axial position of the carriers can be independently adjusted. Thus, the axial position of a header pipe joint supported by one carrier can be adjusted relative to the axial position of a header pipe joint supported by the other carrier.

It will be readily appreciated that a header pipe joint is a section of pipe with a valve installed therein, which is connectable inline of a spool or pipeline.

It will be understood that where "locking" is referred to in relation to carrier, this is intended to mean "fixedly attached", so that relative movement between the locked entities is prevented.

It is envisaged that the uses for such a carrier may extend beyond the particular subsea assemblies as described in the present application.

In yet another aspect, there is provided a subsea installation comprising: a carrier guide; and a carrier for receiving a pipe; wherein the carrier is slidably received in the carrier guide such that the carrier may slide with respect to the carrier guide; wherein the carrier comprises a support for supporting at least a portion of the pipe; such that a pipe supported by the support may be slid with respect to the carrier guide.

The carrier is therefore slidable back and forth to facilitate axial alignment of a pipe supported thereby. A locking mechanism may be provided which is configured to lock the carrier to the carrier guide after axial alignment has been achieved. The carrier may preferably be powered to cause it to slide within the carrier guide. The pipe may be any pipe requiring support and axial alignment at a subsea structure, such as a header pipe joint as described herein or another section of pipe or spool. The carrier guide will generally be locked to the subsea installation, e.g. a structure on which the carrier guide is mounted. The subsea installation may further comprise a second carrier guide and a second carrier slidably received in the second carrier guide such that the second carrier may slide with respect to the second carrier guide. The second carrier may comprise a support for supporting at least a portion of a second pipe. The carriers may be slidable relative to each other such that the pipe and second pipe supported thereby are slidable relative to each other. The numerous optional features described above in relation to carriers of other aspects are similarly applicable here It will be appreciated that the numerous optional and preferred features described above in relation to the different aspects of the invention may also be applicable to the other aspects of the invention, and vice versa.

Preferred embodiments of the present invention will now be described by way of example only and with reference to the accompanying drawings, in which:

FIG. 3b illustrates the installation of a retrievable alignment tool on the anchor post of the subsea structure of FIG. 3a;

For ease of understanding, like reference numerals are used to identify similar structural features in the various embodiments.

Figure 24:
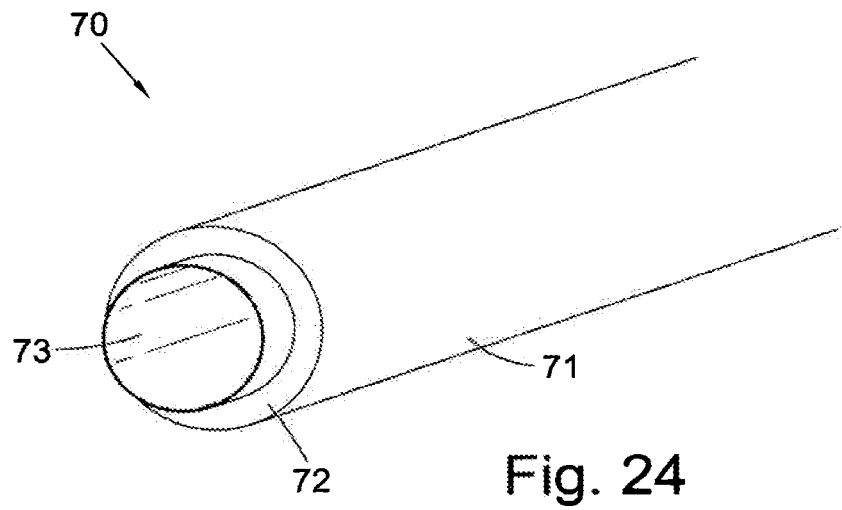
FIG. 24 illustrates a rigid pipeline according to the prior art.

Where "pipeline" is referred to in the embodiments described below, it is meant a pipeline known to those skilled in this technical field as a "rigid pipeline". An example of such a rigid pipeline 70 is illustrated in FIG. 24. Such a rigid pipeline 70 typically comprises an external sheath of insulation 72 having a corrosion resistant coating 71, surrounding a product pipe 73. The product pipe 73 is generally a metal pipe, typically of stainless steel or carbon steel. Such rigid pipelines are typically manufactured in 12 m sections (pipe lengths) which are welded together. Although such pipelines are known as rigid pipelines, the skilled person would well appreciate that they are not necessary entirely rigid. They will generally have a small amount of elastic flexibility, so that they can flex a small amount, but if pushed to flex beyond this then the pipeline would be damaged, e.g. kink or fracture. The flexibility present in such rigid pipelines would generally allow some sagging of the pipeline during the laying process.

Figure 25:
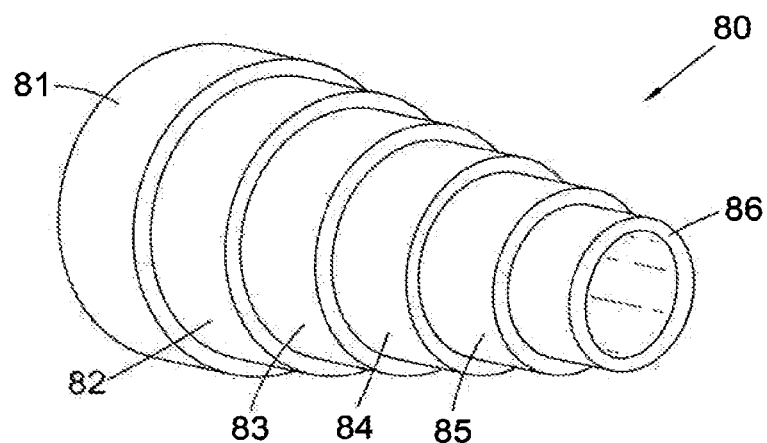
FIG. 25 illustrates a flexible pipeline according to the prior art.

Such a rigid pipeline 70 is to be contrasted with pipelines known as flexible pipelines 80. An example of a flexible pipeline 80 is illustrated in FIG. 25. Such a flexible pipeline 80 typically comprises a number of flexible layers 81 to 86. Layer 81 may be a corrosion resistant sheath, layers 82 to 85 may be various armoured layers and insulating layers, whilst the innermost layer 86 will comprise a carcass, typically a stainless steel carcass. Each of these layers has a degree of flexibility so that the entire pipeline 80 is flexible. The flexible layers may e.g. be corrugated or spiral formed, to provide the flexibility. It will be well appreciated that such a flexible pipeline 80 is much more complex than the rigid pipeline 70 since the multiple layers are required to provide the flexibility. Thus, flexible pipeline is much more expensive and complex to manufacture. It is also less strong and less robust that rigid pipeline, has more leak points, and is less resistant to ageing, temperature and pressure. It has to be manufactured at its complete length, it cannot be made in sections and welded together in the way that rigid pipelines can be. Flexible pipelines may also be called hoses.

Consequently, rigid pipelines are much preferred in embodiments of the present application.

Figure 1:
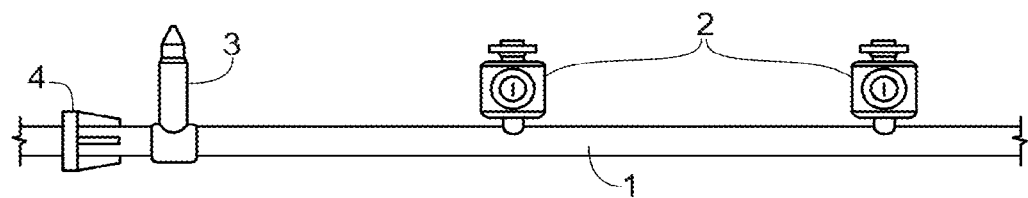
FIG. 1 illustrates a header pipe joint having valves installed therein, according to a first embodiment of the invention.
Figure 2:
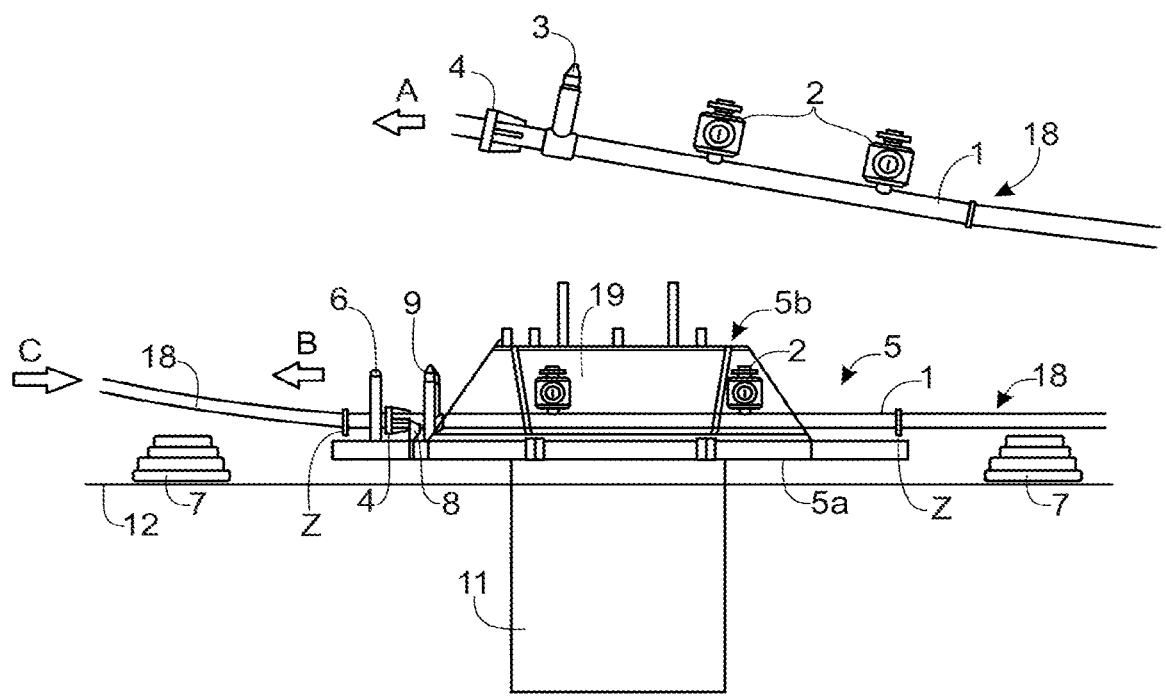
FIG. 2 illustrates the laying of a pipeline having the header pipe joint of FIG. 1 at a subsea structure.

FIGS. 1 to 7 relate to a method and subsea assembly of a first embodiment of the invention. Referring to FIGS. 1 and 2, a header pipe joint 1 is provided having two valves 2 installed therein. A subsea structure 5 comprises a support structure 5a (a support frame), two xmas trees 5b, and a foundation on which the support structure 5a is mounted and which provides support for a wellhead (not shown).

In this embodiment the foundation is in the form of two suction anchors 11 on which the support structure 5a is mounted, but in other embodiments the foundation may be a mudmat or a piled arrangement.

In other embodiments, subsea structures may comprise different numbers of Xmas trees, or indeed subsea production systems other than Xmas trees such as riser bases, pumps and compressor stations.

Each valve 2 in the header pipe joint 1 has a connector for fluidly connecting to an xmas tree 5b of the subsea structure 5. The two valves 2 are spaced according to pre-determined hook-up points, which in this embodiment are wing connection hubs 13, on the xmas trees 5b. The header pipe joint 1 with the two valves 2 may be tested and interface checks performed at a fabrication/mobilisation site prior to shipment to check that the header pipe joint will fit with the structure as intended. An anchor post 3 and axial ram plate 4 are also attached to the header pipe joint 1 at the fabrication site prior to shipment.

The header pipe joint 1 is installed (integrated) inline of a rigid pipeline 18 on a lay vessel (not shown), i.e. above the surface and not sub-sea, e.g. by welding or bolting. The header pipe joint 1 is in fact installed inline of and in between two pipeline sections forming pipeline 18. It could therefore be considered that the header pipe joint 1 is inline of two pipelines, but for simplicity this description will refer just to pipeline 18.

FIG. 2 illustrates the laying of the pipeline 18 having the header pipe joint 1 installed therein, into the support structure 5a of the subsea structure 5. It will be appreciated that the foundation (i.e. the suction anchors 11) and the support structure 5a have been pre-installed at the sea bed prior to laying of the pipeline 18.

The subsea structure 5 includes two side protection covers 19 (both visible in FIG. 4), and a top protection cover (omitted from the drawings). Reference numeral 12 denotes the sea floor.

In the upper part of the Figure the pipeline 18 is shown descending towards the subsea structure 5, being pulled in the direction of arrow A. The lower part of the Figure shows the pipeline 18 being guided and pulled into the subsea structure 5 in the direction of arrow B. Lines Z indicate the joins between the header pipe joint 1 and the pipeline 18.

An anchor post 9, alignment frame 6 and latching mechanism 8 are mounted on support structure 5a. The alignment frame 6 provides initial lateral guiding of the pipeline 18 as well as axial positioning due to interaction between the alignment frame 6 and the axial ram plate 4. The interaction occurs when the pipeline 18 is pulled by the lay vessel until the ram plate 4 comes to rest when rammed up against the alignment frame 6. The latching mechanism 8 is then activated to ensure locking in the axial direction.

In the illustrated embodiment, the anchor post 9, alignment frame 6 and latching mechanism 8 are located on the side of the subsea structure which receives the header pipe joint last. The anchor post 3 of the header pipe joint is similarly located on the side of the header pipe joint which is to be received at the structure last. Thus, considering FIG. 2, the header pipe joint will be received by the right side of the subsea structure first, then gradually laid down and received at the left side of the structure afterwards. In other embodiments the anchor post 8, alignment frame 6 and latching mechanism 8 could be located on the other side of the subsea structure, i.e. the side which receives the header pipe joint first (the right side of FIG. 2). The header pipe joint would then also have the anchor post 3 located on the side to be received at the structure first.

Concrete inflatable support bags 7 are provided forward and aft of the subsea structure 5. These enable the pitch angle of the pipeline 18 to be controlled. In other embodiments, gravel bags, rock heaps/dumps or a frame structure may be used for a similar purpose.

Figure 3A:
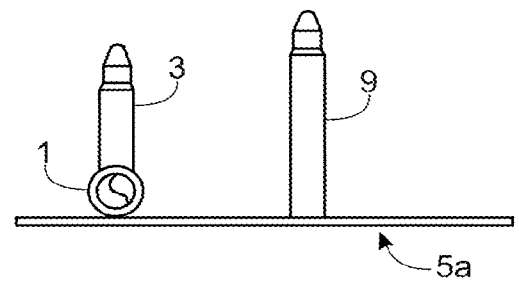
FIG. 3a illustrates the anchor posts of the header pipe joint and subsea structure viewed in the direction of arrow C in FIG. 2.
Figure 3B:
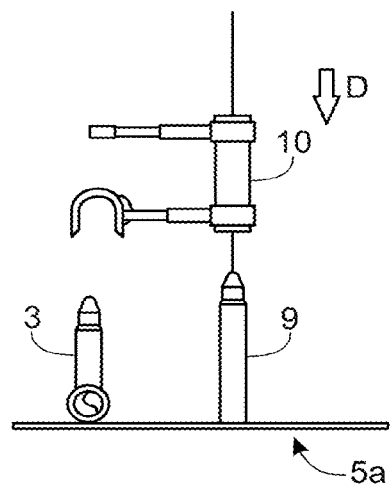
Figure 3C:
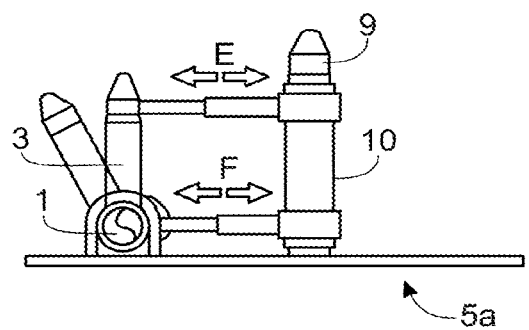
FIG. 3c illustrates the adjustment of yaw and roll using the retrievable alignment tool of FIG. 3b.

FIG. 3a shows the anchor post 3 of the header pipe joint 1 and anchor post 9 of the support structure 5a viewed in the direction of arrow C in FIG. 2, with the header pipe joint 1 shown in cross-section. In order to perform final adjustment of yaw and roll, a retrievable alignment tool 10 is installed onto the anchor post 9 in the direction of arrow D in FIG. 3b. Once installed onto the anchor post 9, the retrievable alignment tool 10 is then hooked up to the anchor post 3 on the header pipe joint 1, as shown in FIG. 3c. Roll can be adjusted by movement in the direction of arrow E, and yaw can be adjusted by movement in the direction of arrow F.

Figure 4:
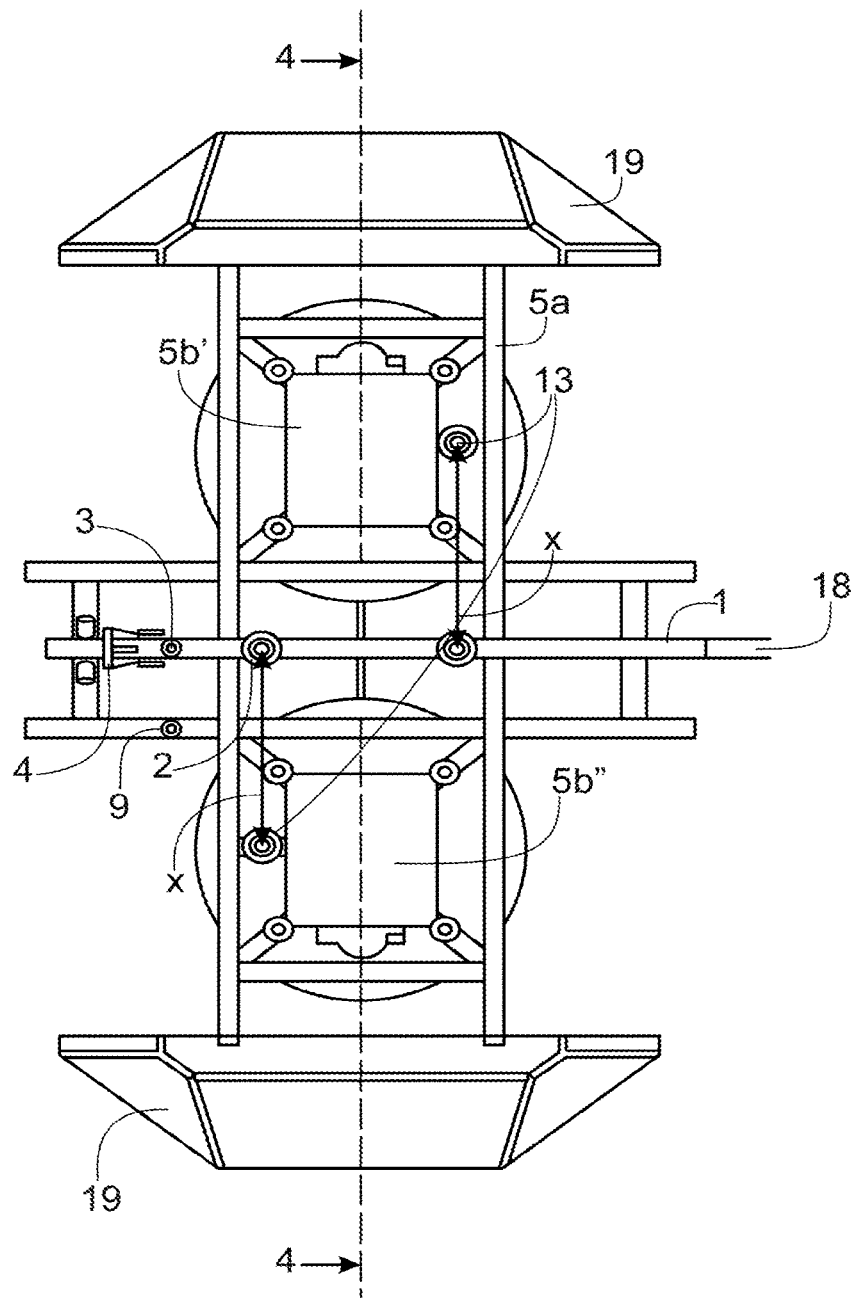
FIG. 4 is a simplified plan view of the subsea structure having a header pipe joint laid thereat according to the first embodiment.

A simplified plan view of the subsea structure 5 having a pipeline 18 laid thereat is shown in FIG. 4. Arrows X show that each valve 2 is aligned with a respective wing connection hub 13.

Figure 5:
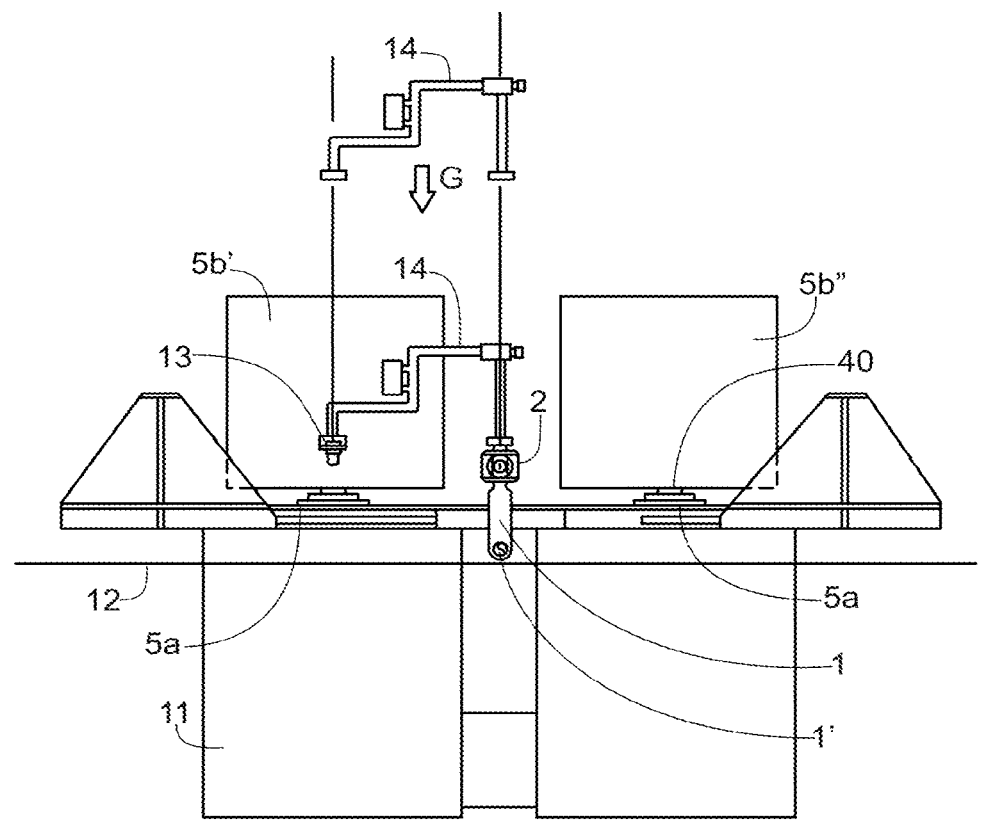
FIG. 5 is a simplified side cross-sectional view along the line 4-4 of FIG. 4, illustrating the installation of a choke bridge between the header pipe joint and subsea structure according to the first embodiment.

Once the pipeline 18 having header pipe joint 1 installed therein is aligned with and locked relative to wing connection hubs 13 on the Xmas trees 5b (denoted 5b' and 5b"), two choke bridges 14 are lowered in place as shown in FIG. 5 by a rig or construction vessel. At the top of the Figure one choke bridge 14 is shown descending towards the structure 5 in the direction of arrow G. It is then shown installed in place at the structure 5. One end of the choke bridge 14 is connected to the Xmas tree 5b' at wing connection hub 13, and the other end of the choke bridge 14 is connected to a valve 2 in the header pipe joint 1. Thus, the pipeline 18 is fluidly connected to the well by means of the choke bridge 14. Another choke bridge 14 (not shown in FIG. 5) is provided to connect the other xmas tree 5b" with the other valve 2 in the header pipe joint 1.

The subsea structure 5 comprises wellheads 40 on which the xmas trees 5b are mounted. The wellheads 40 are mounted in the suction anchors 11. Therefore, since the xmas trees are mounted to the suction anchors 11 via wellheads 40, and the support frame 5a is mounted to the suction anchors, the header pipe joint 1 is locked in position relative to the xmas tree to which it is connected via connection bridge 14.

Figure 7:
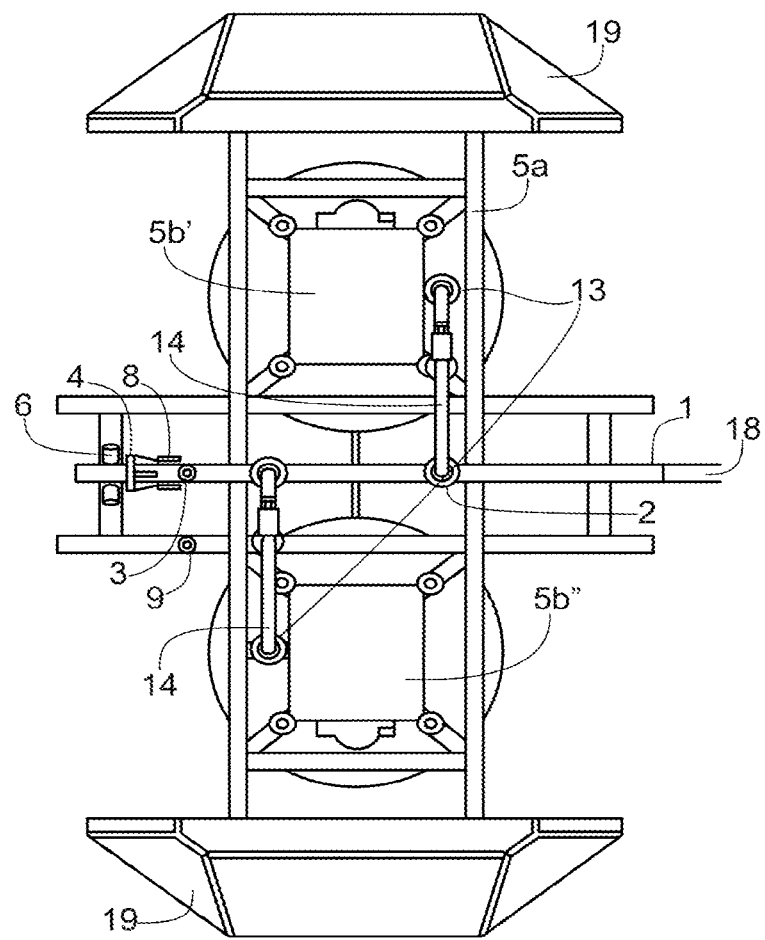
FIG. 7 is a simplified plan view of the subsea structure having a header pipe joint laid thereat after the installation of a choke bridge between the header pipe joint and each of the two xmas trees, according to the first embodiment.

The header pipe joint 1 can be seen in FIG. 5 extending from the valve 2, and is then shown in cross-section 1' (since it extends in a direction out of the page, as will be understood by comparing with the plan view of FIG. 7).

A simplified plan view of the subsea structure 5 with the choke bridges 14 installed between the valves 2 and each of the two xmas trees 5b', 5b", is shown in FIG. 7.

Figure 6:
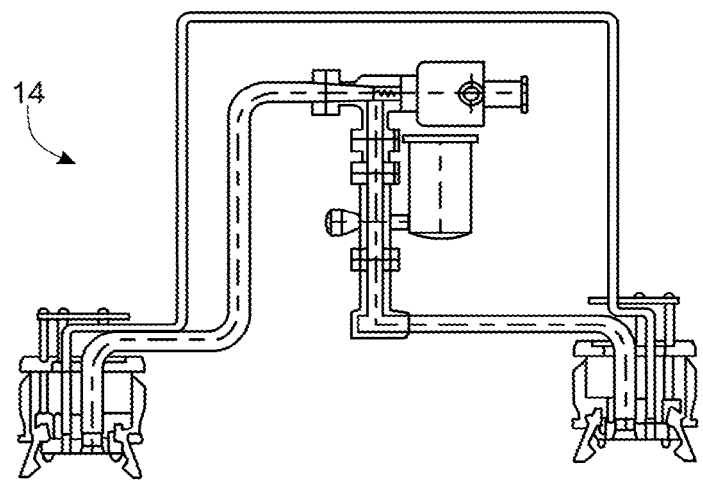
FIG. 6 is a more detailed side cross-sectional view of the choke bridge of FIG. 5.

A choke bridge 14 is illustrated in more detail in FIG. 6. Choke bridges are well known in the art and so will not be described further here. Whilst a choke bridge is used in the illustrated embodiments, the skilled person would appreciate that other connection bridges may be used, for example a bridge without a choke, a spool piece or a jumper. A choke valve may be provided separately to the bridge.

Figure 8:
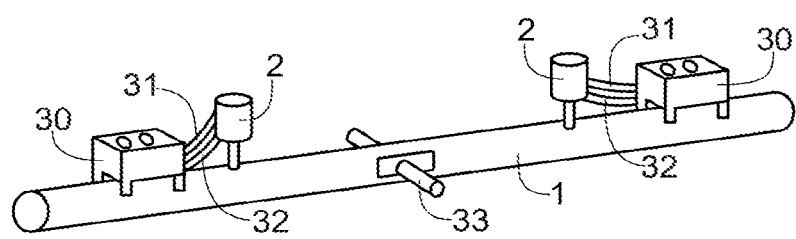
FIG. 8 is a schematic view of a header pipe joint according to a second embodiment of the invention.

FIG. 8 relates to a second embodiment of the invention. This embodiment is similar to the first embodiment, however in this embodiment the header pipe joint 1 (illustrated schematically in FIG. 8) further comprises two ROV operated distribution units 30 (in this case distribution boxes), one connected to each of the two valves 2, for hydraulic lines, chemical lines, service lines and communication lines for each choke bridge. For example, the distribution boxes may comprise small bore piping for the distribution of hydraulic fluid to each choke bridge. The distribution boxes 30 include valves and stab points operable by an ROV. A hydraulic line 31 and a service line 32 is provided between each distribution box 30 and valve 2. The distribution boxes 30 are installed (integrated) in the header pipe joint 1 at the fabrication site when installing the valves.

After the header pipe joint 1 is installed at the subsea structure 5, the distribution boxes 30 will be hooked up by jumper lines (with stab connections) to the respective lines on the seabed.

In other embodiments, the distribution boxes 30 are distribution panels.

The header pipe joint 1 illustrated in FIG. 8 also illustrates a further feature, lever arms 33, which will be described further with reference to FIGS. 9a and 9b (note however that FIGS. 9a and 9b omit the distribution boxes of FIG. 8 for clarity). As described above, FIGS. 3a to 3c illustrate an alignment tool that may be used to align a pipeline 18 having a header pipe joint 1 installed therein, at the subsea structure 5. The second embodiment of FIGS. 9a and 9b provides an alternative way of achieving alignment.

Figure 9A:
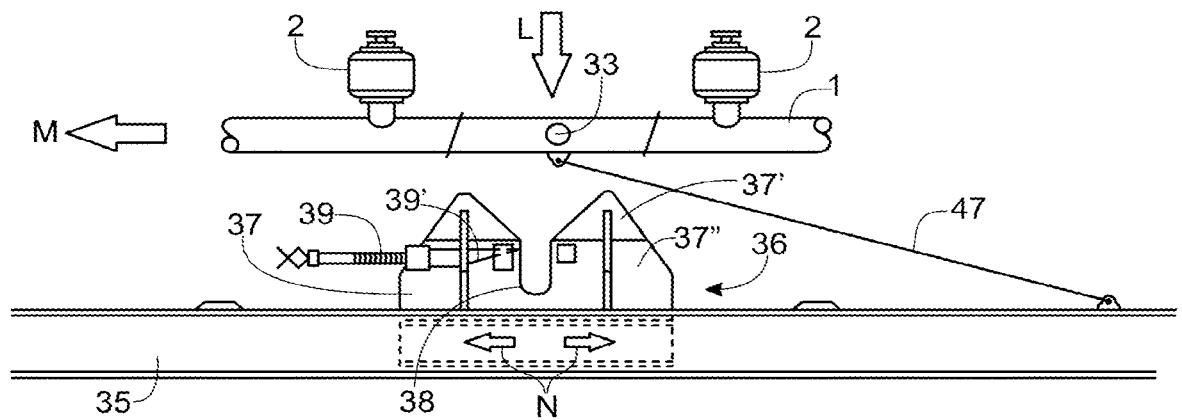
FIGS. 9a and 9b illustrate the alignment of a header pipe joint using a slidable carrier according to the second embodiment.
Figure 9B:
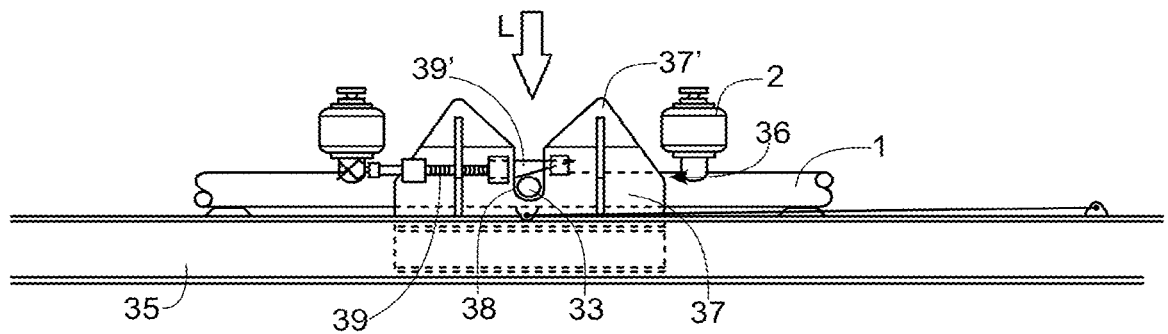

The method of FIGS. 9a and 9b uses a carrier support 35 having a carrier 36 slidably held therein. The carrier support 35 is attached to the support frame 5a of the subsea structure 5. The carrier is slidable back and forth in the direction of arrows N. The carrier 36 is configured to receive the header pipe joint 1 when the pipeline 18 is laid at the structure. FIG. 9a illustrates the header pipe joint 1 approaching the carrier 36 during the laying process. Rigging 47 is attached between the carrier support 35 and the header pipe joint 1 to guide the header pipe joint 1 into place, as it moves down and along in the direction of arrows L and M.

The header pipe joint 1 is provided with two lever arms 33, one extending from each side, which are used to locate the header pipe joint in the carrier 36. The lever arms 33 may alternatively be termed locking pins, locating pins or shafts. The lever arms 33 are illustrated as being cylindrical, but in other embodiments may take other shapes. The lever arms may be fixed, e.g. welded, to the header pipe joint topside.

When the header pipe joint 1 reaches the carrier 36, it is received and supported by a support 37 of the carrier. The support 37 comprises two plates extending upwardly from the base of the carrier 36, one plate arranged on each side of the carrier so that the header pipe joint 1 can be received therebetween.

Each plate comprises a base portion 37" having an opening (slot, groove) 38 therein for receiving a lever arm 33 of the header pipe joint 1. The opening in this embodiment is a slot with straight sides and a curved bottom. Each plate also comprises two guiding faces 37', each extending from the top of the base portion 37" on either side of the opening 38.

The guiding faces 37' are each triangularly shaped, with a straight edge extending at an angle from the top of a straight side of the slot to an apex. Thus, an obtuse angle is formed between the straight side of the slot and the edge of the guiding face 37'. The obtuse angle is preferably at least 225° or more.

This angled edge of the guiding faces 37' act as a guiding system for the lever arm 33 of the header pipe joint 1. As the header pipe joint is lowered into the support, the angled edges "catch" the lever arms 33 and guide them down into the slot.

Furthermore, the guiding faces 37' bend outwards from the base portion 37" of each plate. In other words, they are at an angle to the base portion from which they extend. This can be seen more clearly in FIG. 13 which also shows the carrier 36, and is described later. These angled guiding faces 37' act as a guiding system for the header pipe joint 1. As the header pipe joint 1 is laid into the support 37, the guiding faces 37' can "catch" the header pipe joint 1 once it comes near the support 37, and guide it into and towards the bottom of the support 37.

The reception of the lever arms 33 in the openings 38 locates the header pipe joint 1 in the correct position in the support 37/carrier 36. Arm 39 has a wedge 39' which is then slid across the top of each opening which forces each lever arm 33 to the bottom of the opening 38. The lever arms are positioned on the header pipe joint so that when they are held at the bottom of the openings 38, the header pipe joint 1 is correctly rotationally aligned within the support 37/carrier 36. Thus, by forcing the lever arms 33 to the bottom of the openings 38, the header pipe joint 1 is correctly rotationally aligned in terms of roll, pitch and yaw. Rotational alignment is important so that the valve in the header pipe joint is "upended", i.e. extends straight upwards, to enable connection with the choke bridge.

The carrier 36 is located on the structure 5 in the correct lateral and vertical position, and thus once the header pipe joint 1 is laid in the carrier, it is correctly aligned in terms of sway and heave. Surge (i.e. axial alignment) is adjusted as described later by sliding the carrier.

The wedges 39' may be slid across each opening by means of a screw mechanism at arm 39. They may then be locked in place across the top of each opening 38, thus locking the header pipe joint 1 in the correct position. This is illustrated in FIG. 9b.

The header pipe joint 1 can then be adjusted to the correct axial position by sliding the carrier 36 in the direction of arrows N.

Once correct axial alignment has been achieved, the carrier 36 is locked in position in the carrier support 35, for example by a locking device such as screws, lugs, wedges or similar. Thus, the header pipe joint 1 (and thereby the pipeline 18 it is inline of) is locked in the carrier 36, which is locked to the carrier support 35, which is in turn attached to the support frame 5a, mounted on the suction anchors 11. Furthermore, the xmas trees 5b are mounted to wellheads 40 which are mounted within and to suction anchors 11.

Consequently, the position of the valves 2 in the header pipe joint 1 is fixed relative to the wing connection hubs 13 of the xmas trees 5b. Thus, the valves 2 can be attached via the choke bridges 14 to wing connection hubs 13, without risk of disconnection or damage due to relative movement which may occur should the header pipe joint 1 not be locked in position relative to what it is being connected. This also means that use of rigid choke bridges 14 are particularly suitable, since no flexibility needs to be incorporated to handle fluctuations in relative position which may occur should the header pipe joint not be fixed in place.

In this embodiment, the carrier 36 is powered to cause it to slide within the carrier support 35 and thus enable easy positioning of the carrier 36 and thus the header pipe joint 1 held therein. The position of the carrier is controlled by hydraulic jacking cylinders operated by an ROV.

The carrier may alternatively be termed a "sledge".

The carrier may also be considered as a cradle.

Thus, in this alignment method, the carrier support 35 and carrier 36 are used instead of the ram plate 4, alignment frame 6, anchor post 3, anchor post 9 and alignment tool 10 of the first embodiment.

It will be appreciated that whilst both the distribution panel feature 30 and the shaft 33/carrier 36 feature are described in the same, second, embodiment, these features are independent and may be used separately as well as together. Thus for example, the distribution box feature 30 may be used in the first embodiment (i.e. with the ram plate 4, alignment frame 6, anchor post 3, anchor post 9 and alignment tool 10) instead of the shaft 33/carrier 36 feature, or indeed the shaft 33/carrier 36 feature may be used without the distribution box feature 30.

Figure 10:
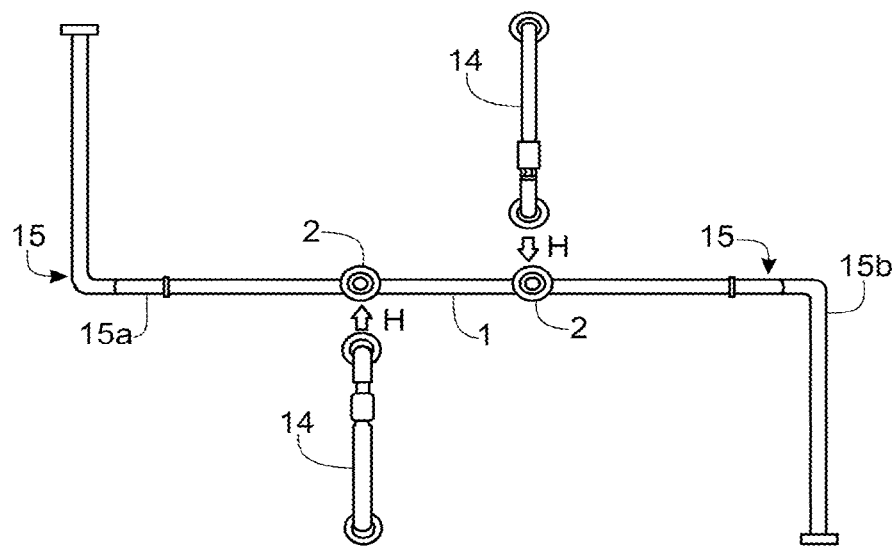
FIG. 10 is a plan view of a spool having valves installed therein, according to a third embodiment of the invention.
Figure 11:
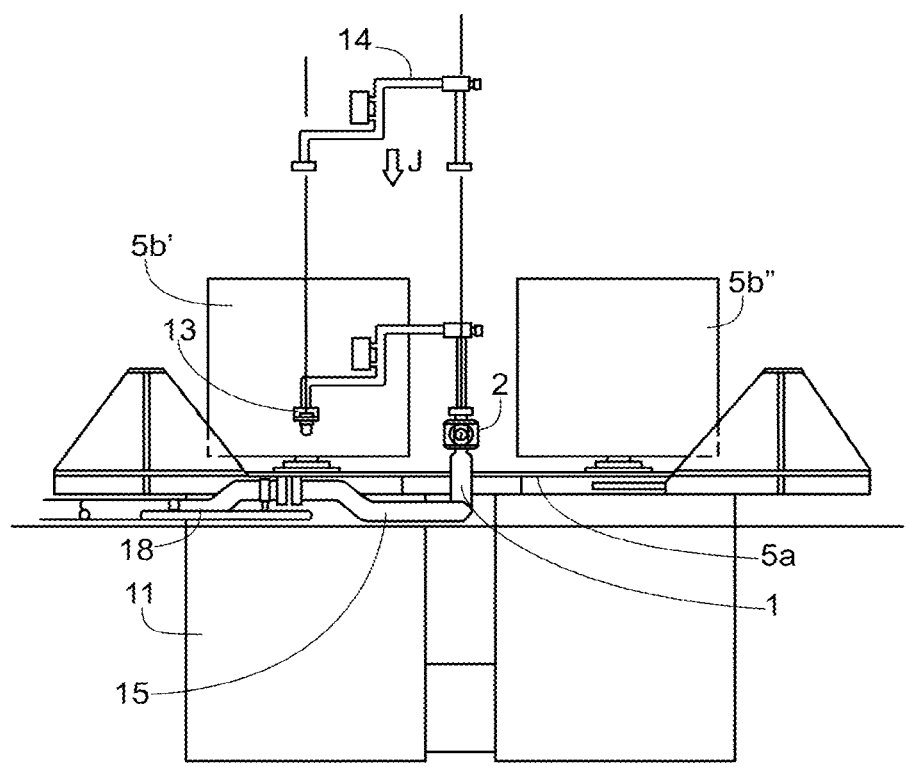
FIG. 11 is a simplified side cross-sectional view illustrating the installation of a choke bridge between the spool of FIG. 10 installed at the subsea structure and the subsea structure, according to the third embodiment.
Figure 12:
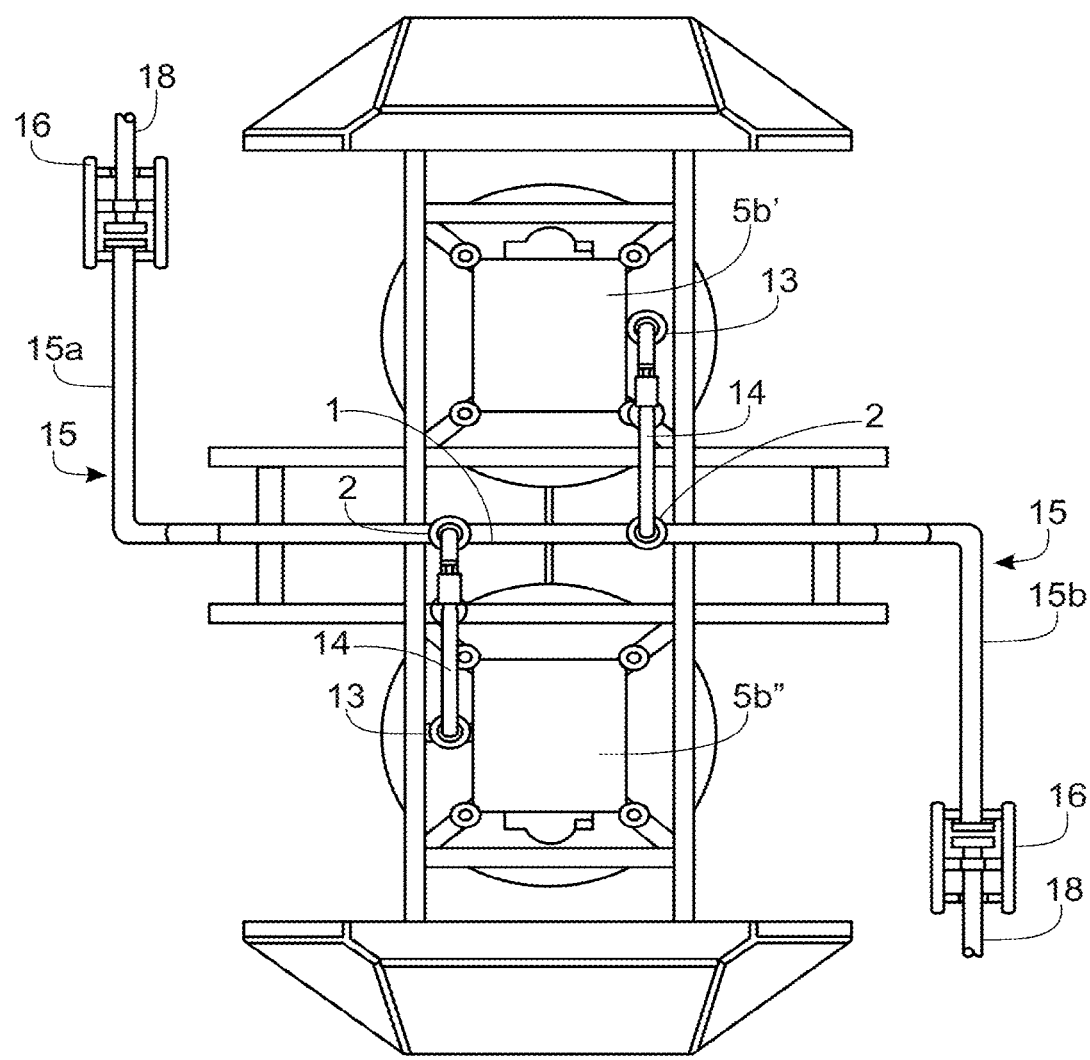
FIG. 12 is a simplified plan view of the subsea structure of FIG. 10 after the installation of a choke bridge between the spool and each of the two xmas trees, according to the third embodiment.

FIGS. 10 to 12 relate to a method and subsea assembly of a third embodiment of the invention. This embodiment has similarities with the first and second embodiments of FIGS. 1 to 9, except that instead of a header pipe joint 1 being installed inline in the pipeline 18, the header pipe joint 1 is installed inline in a spool 15. The spool 15 in fact comprises two spools 15a, 15b, or two "spool pieces", one connected at each end of the header pipe joint. The header pipe joint is therefore in between the two spools 15a, 15b. However, for simplicity, "spool 15" will be referred to in this description.

A plan view of a spool 15 having the header pipe joint 1 installed therein is illustrated in FIG. 10. As in the first embodiment, the header pipe joint 1 has two valves 2 installed therein, each having a connector for fluidly connecting to a subsea production system such as a Xmas tree 5b mounted on a suction anchor 11. The valves 2 are spaced according to pre-determined hook-up points, in this embodiment wing connection hubs 13, on each xmas tree 5b. The header pipe joint 1 having the two valves 2 is welded or bolted to the spool 15 e.g. on a construction vessel prior to installation sub-sea.

A choke bridge 14 is shown adjacent to each valve 2, these will be connected to the valves 2 (see arrows H) as described further below.

During installation, the spool 15 is lowered into the subsea structure 5 by a lifting operation. Once it is in place it is locked relative to the wing connection hubs 13 on the Xmas trees 5b. Two choke bridges 14 are then lowered in place as shown in FIG. 11 by a rig or construction vessel. At the top of the Figure one choke bridge 14 is shown descending towards the structure 5 in the direction of arrow J. It is then shown installed in place at the structure 5. One end of the choke bridge 14 is connected to the Xmas tree 5b' at wing connection hub 13, and the other end of the choke bridge 14 is connected to a valve 2 in the spool 15. Similarly another choke bridge 14 (not shown) connects the Xmas tree 5b" with the other valve 2 in the spool 15.

A simplified plan view of the subsea structure 5 with the choke bridges 14 installed between the header pipe joint 1 of the spool 15 and each of the two xmas trees 5b', 5b", is shown in FIG. 12. Each end of the spool 15 is connected to the pipeline 18 via connector 16. This connection is performed by ROV after installation of the spool 15. Thus, the pipeline 18 is fluidly connected to the well by means of the spool 15 (having header pipe joint 1 integrated therein) and choke bridges 14. The spool 15 is therefore "inline" with the pipeline, the header pipe joint 1 is inline of the spool, and the valves 2 in the spool 15 may be considered as "inline valves".

The distribution boxes 30 of the second embodiment of the invention may also be used in the third embodiment of the invention.

As mentioned above, in this third embodiment of the invention, once the spool 15 has been lifted into the structure 5, it is locked relative to the wing connection hubs 13 on the Xmas trees 5b. This locking may be achieved utilising a carrier 36'. The carrier 36' is similar to the sliding carrier 36 as described above in relation to the second embodiment of the invention, except in this embodiment the carrier 36' is fixed in place in a carrier support 35': it is not slidable within the carrier support 35'. Sliding is not needed in this embodiment since axial adjustment is not required; as the spool is lowered down from the construction vessel the guide wires will provide the necessary alignment.

Figure 13:
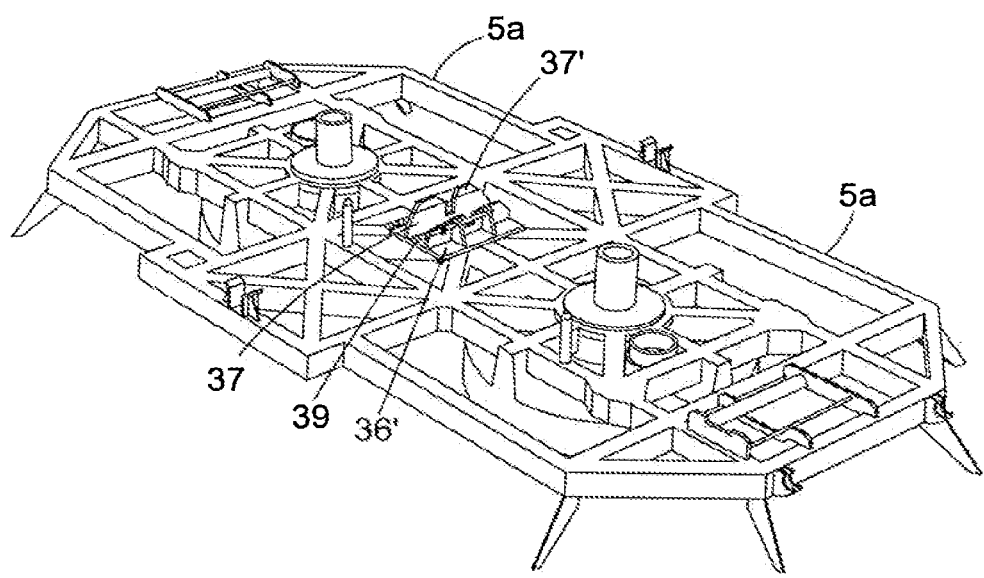
FIG. 13 is simplified view of the subsea structure of the third embodiment, further comprising a carrier.
Figure 14:
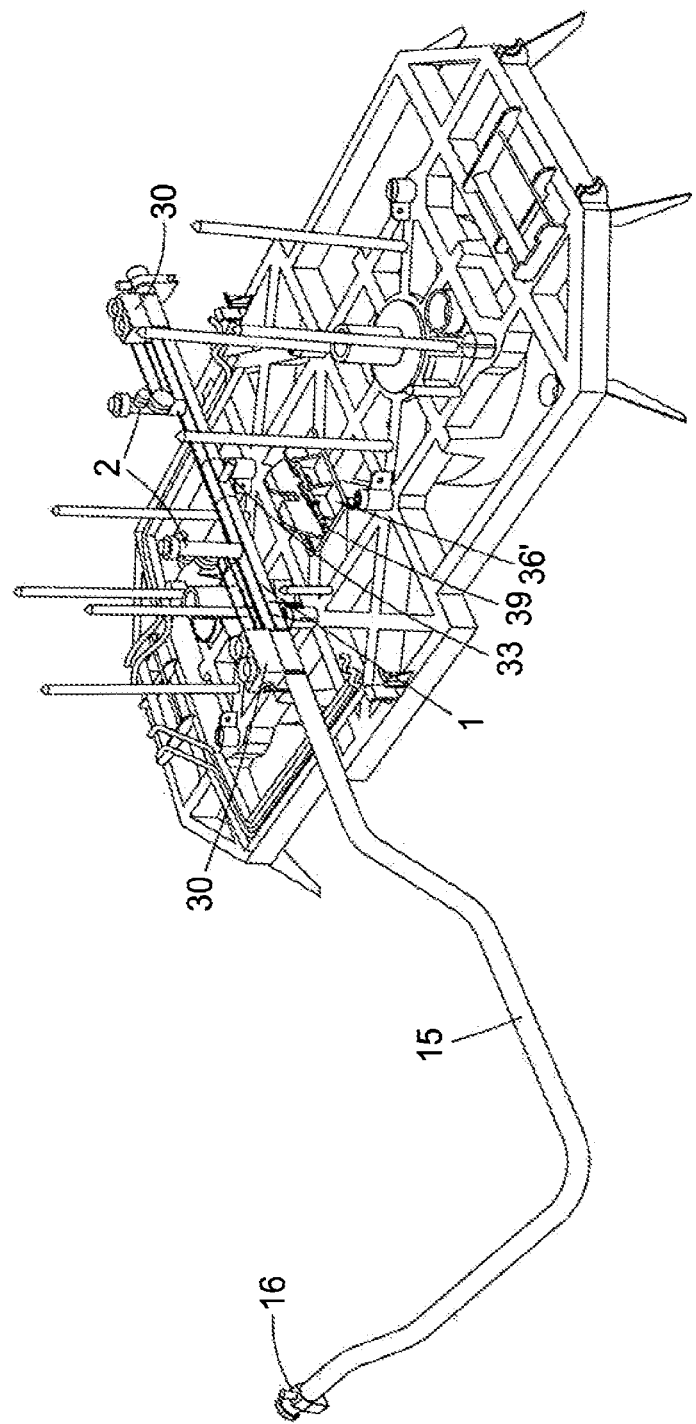
FIG. 14 illustrates a header pipe joint inline of a spool being lowered into the subsea structure of FIG. 13.
Figure 15:
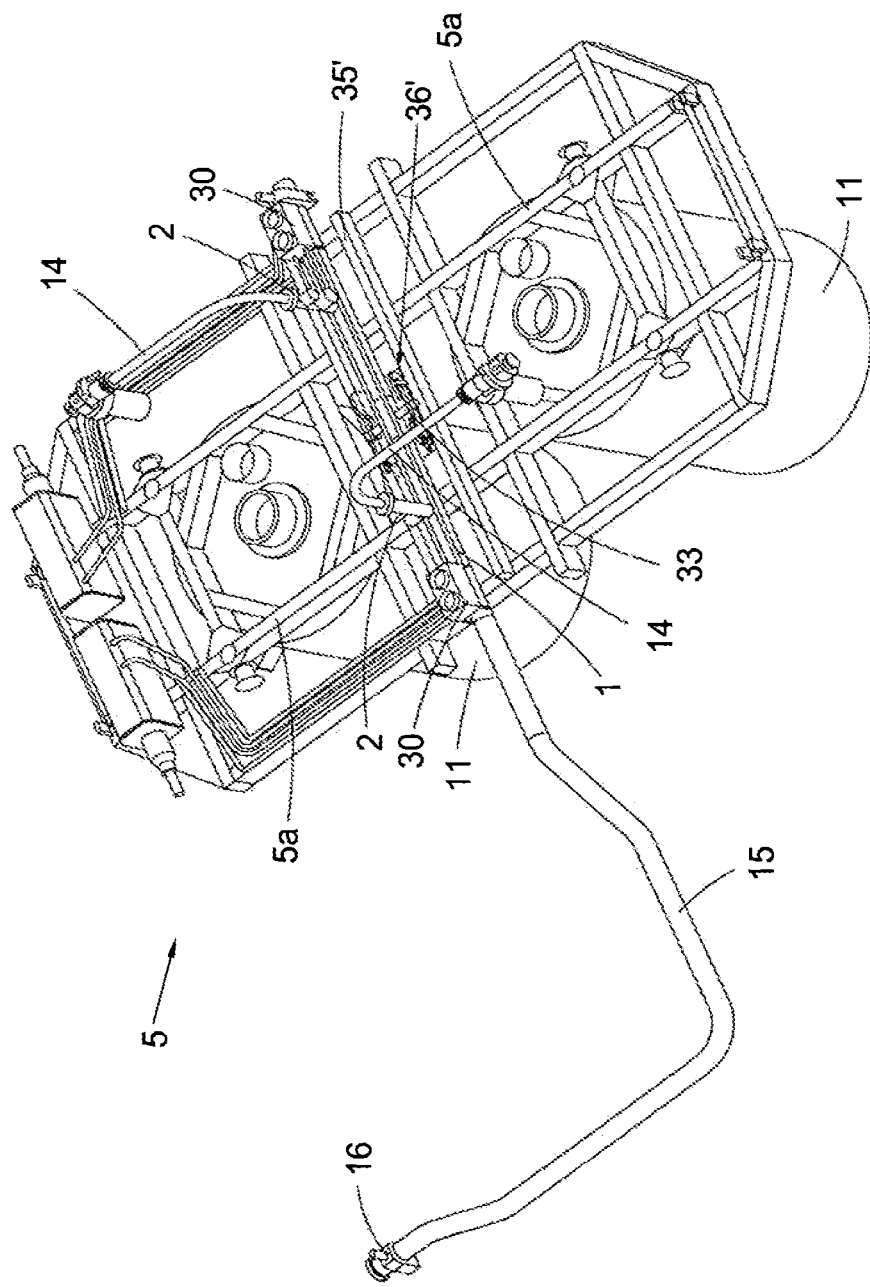
FIG. 15 illustrates the a subsea structure similar to that of FIG. 14 once a header pipe joint is locked in the carrier.
Figure 16:
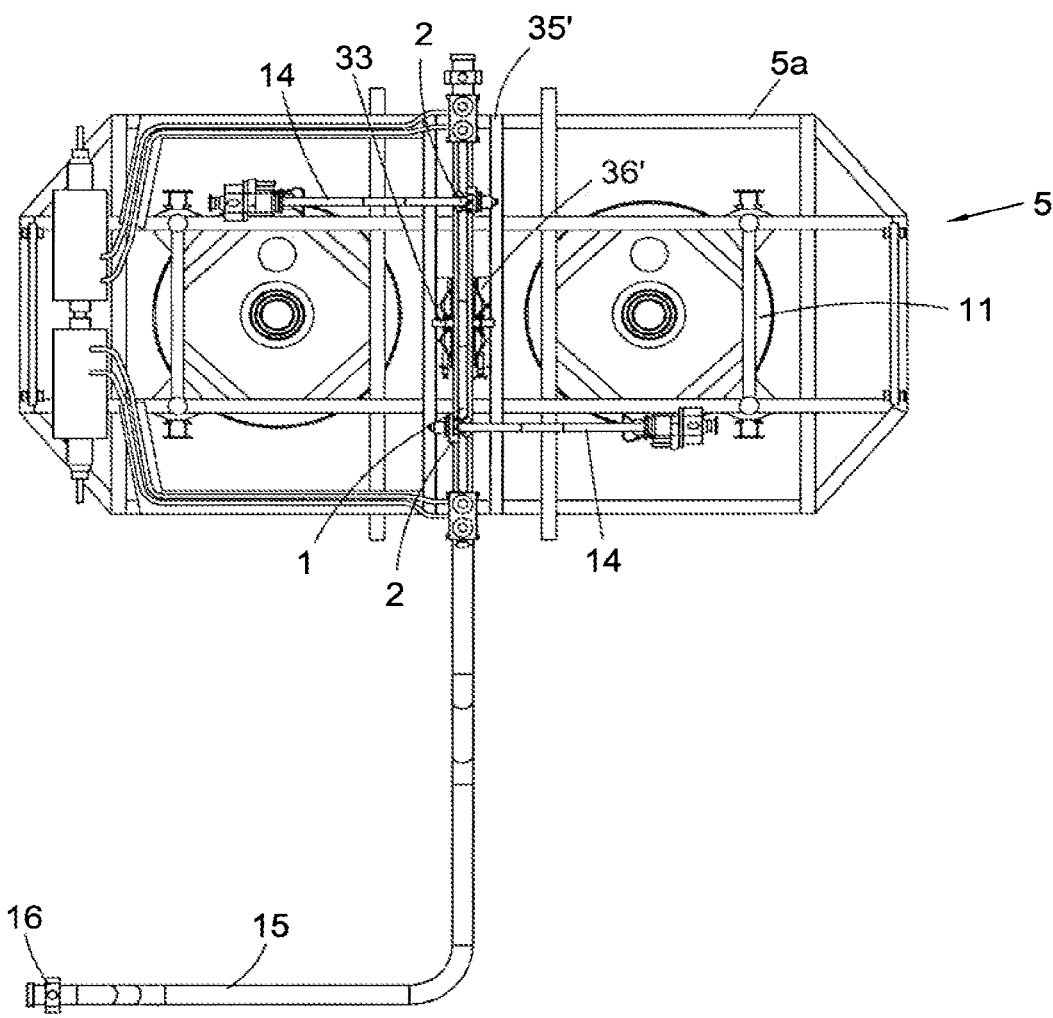
FIG. 16 is a plan view corresponding to FIG. 15.

A simplified view of a modified subsea assembly of the third embodiment of the invention, further illustrating a carrier 36', is illustrated in FIG. 13. In this Figure, for simplicity, the carrier support 35' is not shown. As illustrated in FIG. 14, the header pipe joint 1 inline of the spool 15 is lowered towards the carrier 36'. This is then received within the carrier 36' as illustrated in FIGS. 15 and 16. Lever arms 33 of the header pipe joint 1 fit within openings 38 on either side of the carrier 36' so as to locate the header pipe joint in the correct position in the carrier. Arms 39 having wedges 39' are slid across to force the lever arms 33 to the bottom of the openings 38 and lock the header pipe joint 1 in place, as described above in relation to FIGS. 9a and 9b. Once the header pipe joint 1 is locked in place, choke bridges 14 are connected between the valves 2 and wing connection hubs 13 (not shown) on the subsea structure 5 as is described previously above in relation to this third embodiment. A subsea structure 5 very similar to that of FIGS. 13 and 14, having the choke bridges connected, can be seen in FIGS. 15 and 16.

The first and second embodiments of the invention provide a simpler arrangement than the third embodiment, since no spool 15 is required in the first and second embodiments, rather the header pipe joint 1 is installed directly inline with the pipeline 18. The installation process of the pipeline in the first and second embodiments is however more complex than the third embodiment due to the need to lay the pipeline 1 into the structure 5 and align it correctly for the choke bridge 14 connections to be made. Thus, the first or second embodiment may be selected depending on whether simplified components or simplified installation is more important in the particular scenario.

Furthermore, and particularly importantly, the pipeline size will affect which embodiment is preferred for a particular application. The first and second embodiments will work better for smaller diameter pipelines. When the pipeline diameter is large, e.g. 18 inches (45 cm), it is more difficult to correctly position the pipeline in the structure. However, the third embodiment of the invention can be successfully used with large pipelines so may be preferable in that scenario.

In the embodiments of all of FIGS. 1 to 12, the header pipe joint is inline of and in between either two pipeline sections or two spools. These subsea structures may therefore be used in a subsea system comprising a chain of structures, with the subsea structures each being intermediate structures in the chain. Each structure is connected to two other structures.

Figure 21:
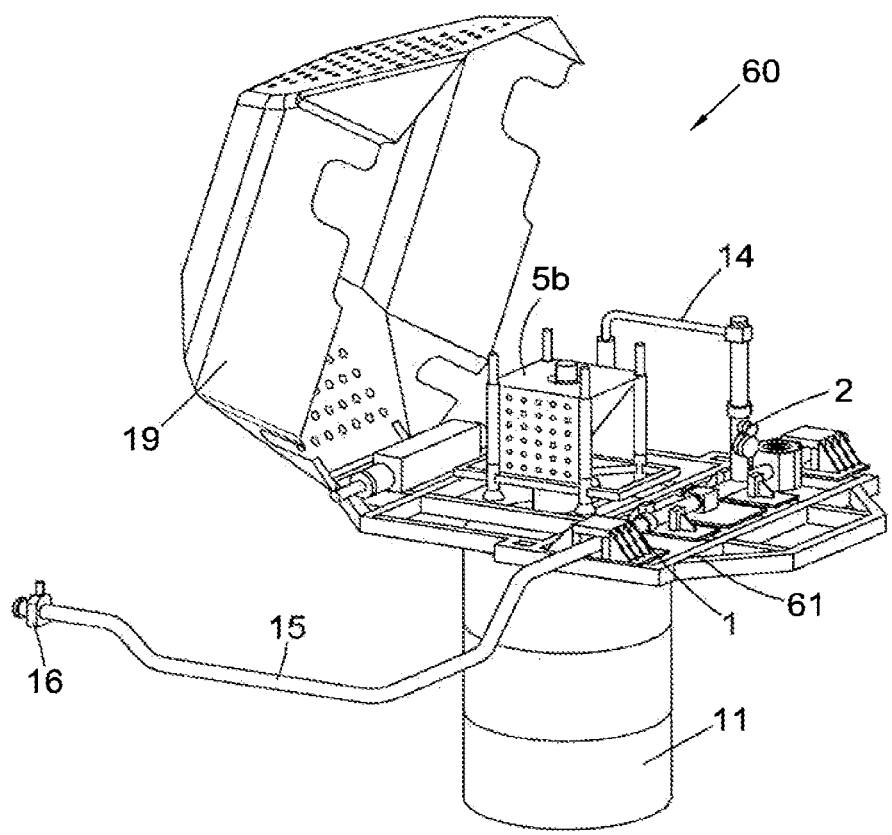
FIG. 21 is a perspective view of an embodiment comprising only one well slot.
Figure 22:
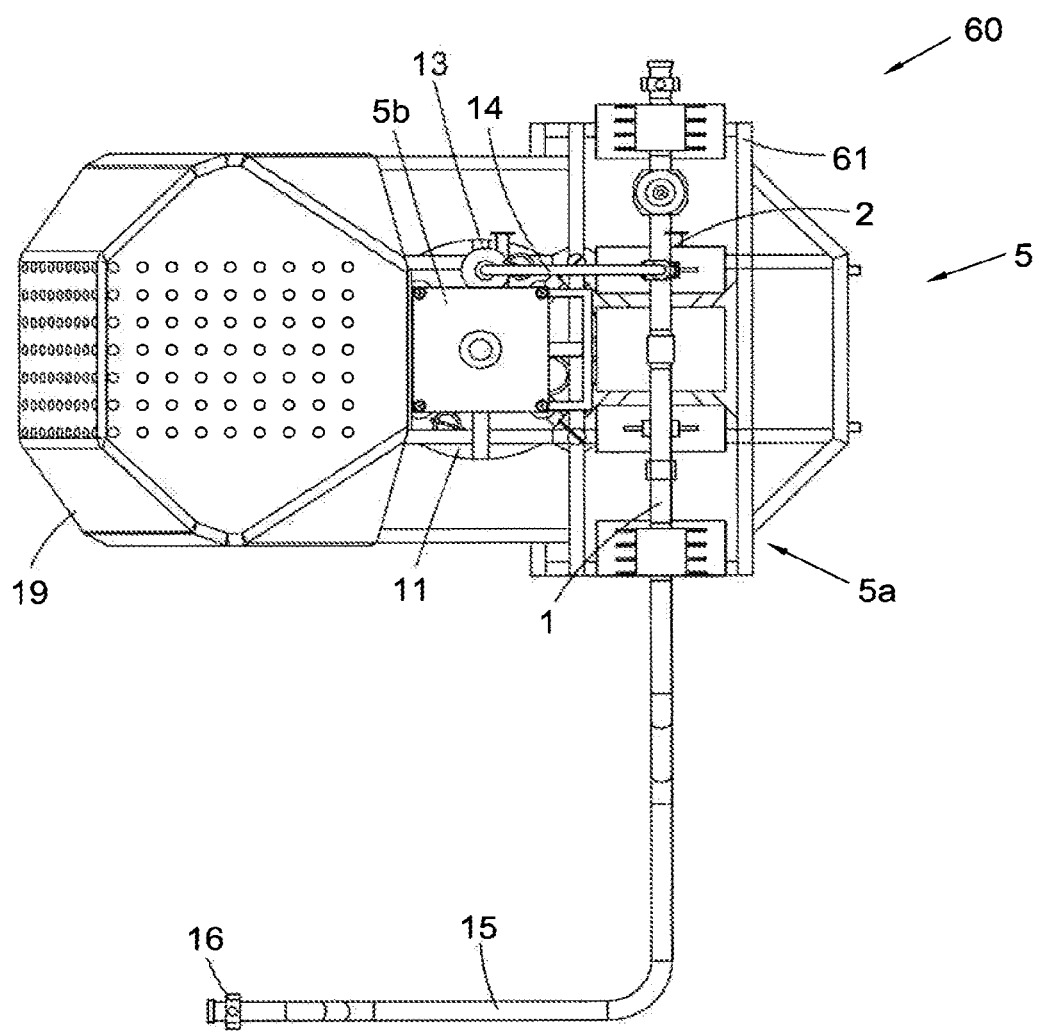
FIG. 22 is a plan view of the embodiment of FIG. 21.

However, the subsea structures may also be used as an end structure in a chain of structures. The embodiment of FIGS. 13 to 16 is in fact an end structure. As can be seen, the header pipe joint 1 is inline of only one spool 15, and a pipeline will be connected to the spool 15 at connection point 16. The other end of the header pipe joint is an end point: it is not connected to a spool or pipeline. Similarly, FIGS. 21 and 22 illustrate a structure forming an end point of a chain.

Figure 17:
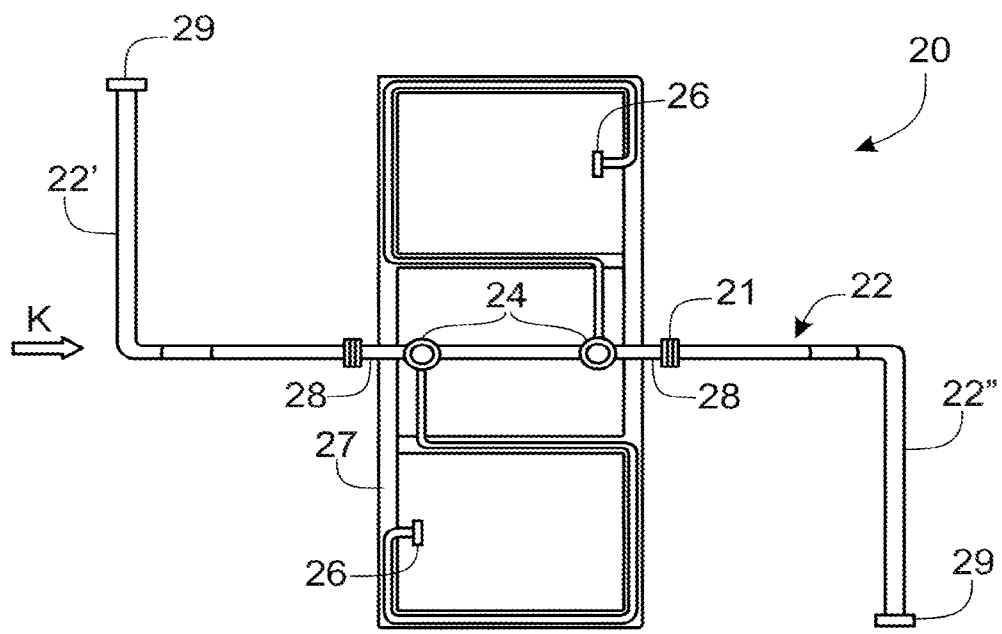
FIG. 17 is a plan view of a manifold having a spool integrated therewith, according to a fourth embodiment of the invention.

FIGS. 17 to 20 relate to a method and subsea assembly of a fourth embodiment of the invention. A manifold 20 having a manifold frame 27, header pipe 28 and branch piping 23 is illustrated in FIG. 17. One section of branch piping 23 is provided for each of the two subsea production systems, Xmas trees 5*b*', 5*b*''. At one end of each section of branch piping 23 there is a connector 26 for connection to a wing connection hub 13 of the respective Xmas tree 5*b*. The other end of each section of branch piping 23 is connected to a respective valve 24 in header pipe 28 (in other embodiments the valve 24 may be provided in the branch piping itself, with the header pipe being connected thereto).

A spool 22 having spool pieces 22' and 22'' is integrated with the manifold 20 by means of compact flanges 21 (in other embodiments other flanges or welding may be used to integrate the spool pieces 22' and 22'' with the manifold 20). One spool piece 22' is connected to one end of the header pipe 28 by a compact flange 21 and the other spool piece 22'' is connected to the other end of the header pipe 28 by a compact flange 21. In this way, the spool 22 is integrated with the manifold 20 and becomes part of the manifold piping. Flanges, including compact flanges, and welded connections are well known in the art and so will not be described further here. This integration of the manifold 20 and spool 22 by compact flanges 21 is carried out above the surface prior to installation of the manifold 20 at the subsea structure 5. For example, this may be carried out on the construction vessel used to lower the manifold with spool into the sea.

Figure 18:
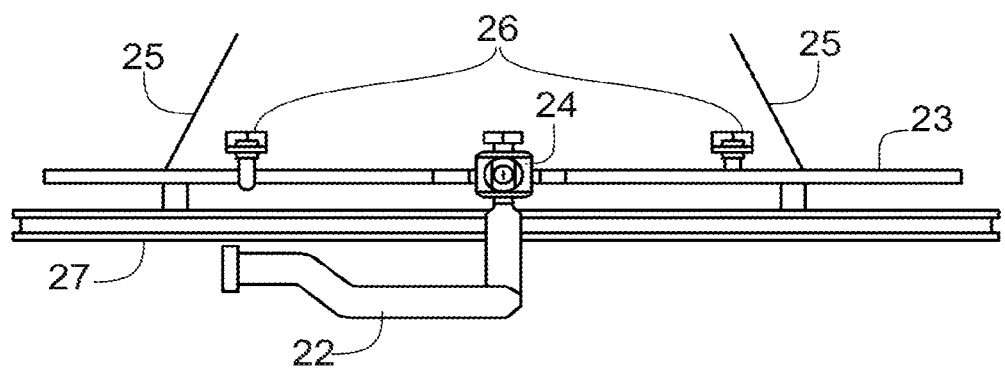
FIG. 18 is a side view of the manifold of FIG. 17, viewed in the direction of arrow K in FIG. 17.

A side view of the manifold 20 is illustrated in FIG. 18, viewed in the direction of arrow K in FIG. 17. In FIG. 18, rigging 25 is also shown which is used to lower the manifold 20 with integrated spool 22 into the sea to the subsea structure 5.

Figure 19:
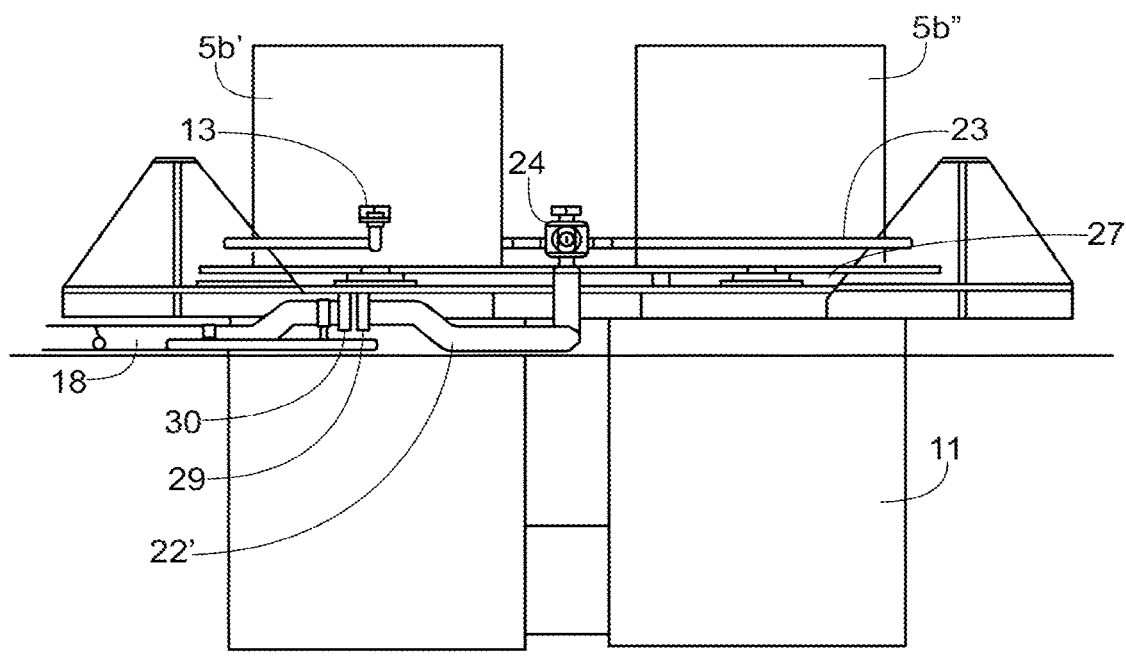
FIG. 19 is a simplified side cross-sectional view illustrating a manifold with integrated spool installed at a subsea structure, according to the fourth embodiment.
Figure 20:
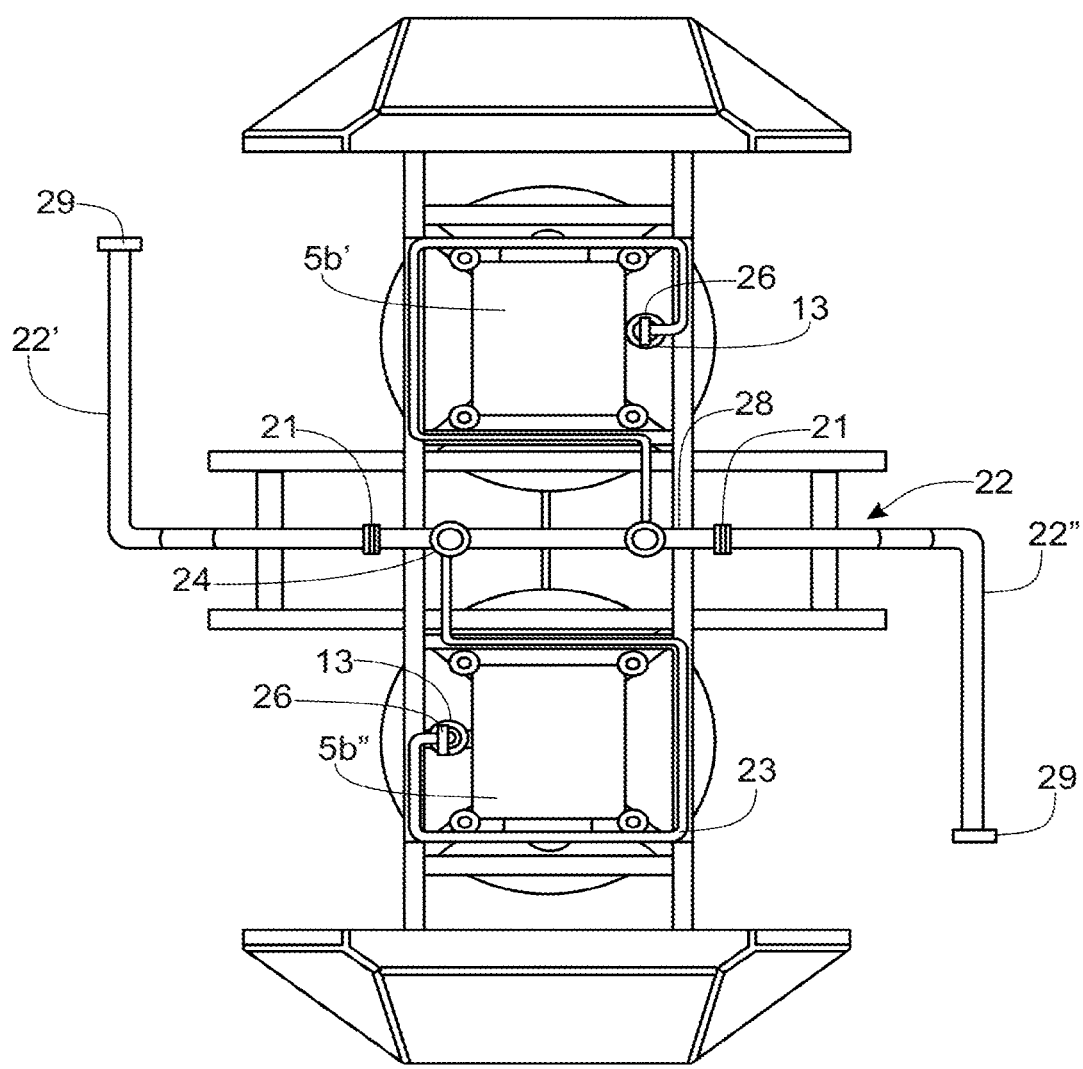
FIG. 20 is a simplified plan view of the subsea structure of FIG. 18.

FIGS. 19 and 20 illustrate the manifold 20 with integrated spool 22 once it has been installed at subsea structure 5, in side cross-sectional view and plan view respectively. The manifold 20 with integrated spool 22 is lowered into the structure 5 and is aligned and locked relative to wing connection hubs 13 on the Xmas trees 5*b*. One end of each spool piece (the end opposite to the compact flange 21) has a connector 29 for connecting to a connector 30 on the pipeline 18. FIG. 19 illustrates the spool piece 22' connected (tied-in) to the pipeline 18 via connectors 29, 30 (not shown in FIG. 18). Typically this connection is made by ROV.

The header pipe 28 incorporates some flexibility, outboard the valve locations (i.e. between each valve 2 and the flange 21), to allow for thermal expansion in the pipeline 18. Furthermore, expansion can be accommodated by the L-shaped spool pieces shown in this embodiment, or by Z shaped spools.

The above described embodiments of the invention are described in the context of a subsea structure having multiple, specifically two, well slots. In these embodiments, the header pipe joint connected inline of a pipeline (first and second embodiments) or inline of a spool (third embodiment) is lowered or laid directly into or onto the subsea structure, between the two well slots. However, the skilled person will appreciate that embodiments may also have more than two well slots, or indeed, only one well slot.

FIGS. 21 and 22 illustrate an embodiment of a subsea assembly 60 comprising only one well slot. This embodiment in fact illustrates a single "Cap-X" structure according to the applicant's Cap-X technology. In this embodiment, a header pipe joint 1 connected inline of a spool 15 is lowered/laid on the balcony (cantilever frame) 61 of support structure 5*a* of subsea structure 5. A choke bridge 14 is lowered in place to fluidically connect valve 2 in the header pipe joint 1 with the xmas tree 5*b*. This single slot assembly clearly has only one well head 11 and one protection cover 19. In this embodiment the subsea assembly 60 is at the end of the pipeline, i.e. the header pipe joint 1 is connected to only one spool 15 (the other end of the spool being connected to a pipeline at connector 16). The other end of the header pipe joint 1 is closed off—no spool is connected to it. So, in this embodiment, the header pipe joint is connected inline of only one spool.

Figure 23:
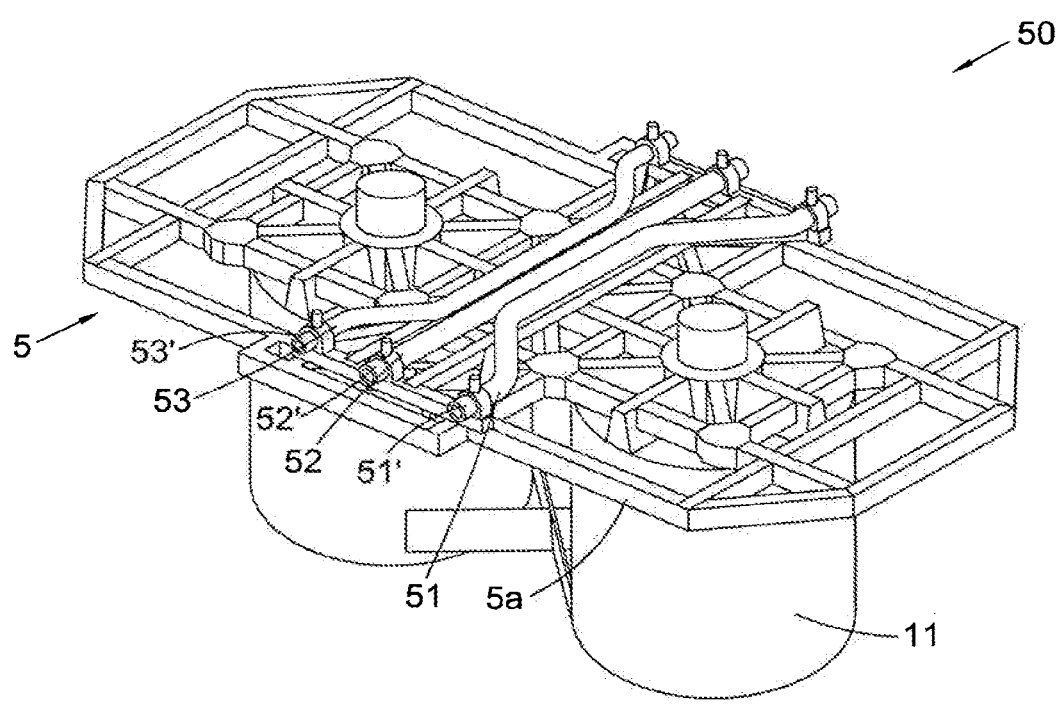
FIG. 23 illustrates a subsea structure having three header pipe joints installed therein.

FIG. 23 illustrates a subsea assembly 50 having a multiple header pipe joint arrangement. Three header pipe joints 51, 52 and 53 are installed at the subsea structure 5, for water, gas and oil respectively. These are installed in the support structure 5*a* (support frame) topside, prior to lowering the support structure 5*a* to the sea bed. Each header pipe joint has at least one valve installed therein (not shown) respectively, for fluidic connection to the subsea structure 5. Once the support structure 5*a* is installed at the sea bed, each valve is connected to the appropriate entity at the subsea structure 5, for example a valve in the oil header pipe joint 53 may be connected to the xmas tree 5*b*. Various valve arrangements may be used. Connection bridges such as choke bridges, as discussed previously in relation to other embodiments, may be used to provide the fluidic connection. The subsea structure may be the applicant's Cap-X structure. It can therefore be understood that a multiple header pipe joint arrangement may be used in combination with the applicant's Cap-X technology.

Each header pipe joint 51, 52, 53 is connected up at connector 51', 52', 53' to a different spool or pipeline, so that it is inline with that spool or pipeline.

Such a subsea assembly 50 having multiple header pipe joints can enable multiple fluidic connections to be easily made, without the need for complex branch piping.

The following clauses set out features of the invention which may or may not presently be claimed in this application but which may form basis for future amendment or a divisional application.

1. A method of installing a header pipe joint at a subsea structure, comprising: providing a header pipe joint having at least one valve installed therein;
  connecting the header pipe joint inline of a spool or pipeline prior to lowering the header pipe joint to the subsea structure;
  lowering the header pipe joint to the subsea structure; and
  connecting the valve to the subsea structure with a connection bridge to provide fluidic connection between the subsea structure and the header pipe joint.

2. A method as described in clause 1, wherein the connection bridge is a spool piece, jumper or choke bridge.

3. A method as described in clause 1 or 2, comprising connecting the valve to a subsea production system at the subsea structure, preferably an xmas tree, riser base, pump or compressor station.

4. A method as described in any preceding clause, wherein the header pipe joint comprises two valves and the method comprises connecting each valve to the subsea structure with a connection bridge; preferably wherein each valve is connected to a different xmas tree, riser base, pump or compressor station at the subsea structure.

5. A method as described in any preceding clause, wherein the step of lowering the header pipe joint to the subsea structure comprises installing the header pipe joint into a support structure, preferably a support frame, at the subsea structure.

6. A method as described in any preceding clause, wherein the header pipe joint has at least one ROV operable distribution unit installed therein for the distribution of hydraulic fluid to the connection bridge.

7. A method as described in clause 6, wherein a hydraulic line and a service line is provided between each distribution unit and a valve.

8. A method as described in clause 6 or 7, wherein after the header pipe joint has been lowered to the subsea structure, the distribution unit is connected by jumper lines with stab connections to lines on the seabed.

9. A method as described in any preceding clause, wherein the header pipe joint is connected inline of a pipeline and the step of lowering the header pipe joint to the subsea structure comprises laying the header pipe joint at the subsea structure.

10. A method as described in any preceding clause, wherein
the header pipe joint is connected inline of a pipeline;
the header pipe joint further comprises an axial ram plate;
the subsea structure comprises an alignment frame;
the step of lowering the header pipe joint to the subsea structure comprises laying the pipeline at the subsea structure;
during the laying step the alignment frame provides lateral guiding of the pipeline;
and wherein the pipeline is pulled into the subsea structure by a lay vessel until the ram plate abuts the alignment frame.

11. A method as described in clause 10, wherein the subsea structure further comprises a latching mechanism for locking the pipeline in the axial direction, and wherein after the pipeline is pulled into the subsea structure by the lay vessel until the ram plate abuts the alignment frame the latching mechanism is activated to lock the pipeline in the axial direction.

12. A method as described in any preceding clause, wherein:
the header pipe joint is connected inline of a pipeline;
the header pipe joint further comprises an anchor post;
the subsea structure comprises an anchor post;
the step of lowering the header pipe joint to the subsea structure comprises laying the pipeline at the subsea structure;
and wherein after the laying step, the yaw and roll of the pipeline is adjusted by movement of the anchor post of the header pipe joint with respect to the anchor post of the subsea structure.

13. A method as described in any of clauses 1 to 8, wherein:
the header pipe joint is connected inline of a pipeline;
the step of lowering the header pipe joint to the subsea structure comprises laying the pipeline at the subsea structure;
the subsea structure comprises a support having a carrier slidably received therein; and
wherein the header pipe joint is received in the carrier during laying of the header pipe joint at the structure;
the method further comprising, after laying of the header pipe joint in the carrier, adjusting the position of the header pipe joint by sliding the carrier.

14. A method as described in any preceding clause, wherein the header pipe joint is connected inline of a spool or pipeline by welding or bolting;
and/or wherein the header pipe joint is connected inline of a spool or pipeline on a lay vessel.

15. A method as described in any of clauses 1 to 8 or 14, wherein the header pipe joint is connected inline of a spool and the step of lowering the header pipe joint to the subsea structure comprise lifting the header pipe joint into the subsea structure.

16. A method of connecting a subsea pipeline to a subsea structure comprising installing a header pipe joint at the subsea structure as described in any of clauses 1 to 8, 14 or 15, wherein the header pipe joint is connected inline of a spool, the method further comprising connecting the spool to the subsea pipeline.

17. A method of connecting a subsea pipeline to a subsea structure comprising installing a header pipe joint at the subsea structure as described in any of clauses 1 to 14, wherein the header pipe joint is connected inline of the subsea pipeline.

18. A subsea assembly comprising:
a subsea structure;
a header pipe joint installed at the subsea structure and having at least one valve installed therein, wherein the header pipe joint is connected inline of a spool or a pipeline; and
a connection bridge connected between the valve and the subsea structure and thereby providing fluidic connection between the header pipe joint and the subsea structure.

19. A subsea assembly as described in clause 18, wherein the connection bridge is a spool piece, jumper or choke bridge.

20. A subsea assembly as described in clause 18 or 19, wherein the valve is connected to an xmas tree, riser base, pump or compressor station at the subsea structure.

21. A subsea assembly as described in any of clause 18 to 20, wherein the header pipe joint comprises two valves and each valve is connected to the subsea structure with a connection bridge; preferably wherein each valve is connected to a different xmas tree, riser base, pump or compressor station at the subsea structure.

22. A subsea assembly as described in any of clauses 18 to 21, wherein the header pipe joint is installed in a support structure, preferably a manifold frame, at the subsea structure.

23. A subsea assembly as described in any of clauses 18 to 22, wherein the pipe joint has at least one ROV operable distribution box or panel installed therein for the distribution of fluid to the connection bridge; preferably wherein a hydraulic line and a service line is provided between each distribution box or panel and a valve.

24. A subsea assembly as described in clause 23, wherein the distribution box or panel is connected by jumper lines with stab connections to lines on the seabed.

25. A subsea assembly as described in any of clauses 18 to 23, wherein:
the header pipe joint is connected inline of a pipeline
the header pipe joint further comprises an axial ram plate
the subsea structure comprises an alignment frame arranged to provide lateral guiding of the pipeline during laying of the pipeline at the subsea structure.

26. A subsea assembly as described in clause 25, wherein the subsea structure further comprises a latching mechanism for locking the pipeline in the axial direction.

27. A subsea assembly as described in any of clauses 18 to 26, wherein:
the header pipe joint is connected inline of a pipeline;
the header pipe joint further comprises an anchor post;
the subsea structure comprises an anchor post;
and wherein the yaw and roll of the pipeline is adjustable by movement of the anchor post of the header pipe joint with respect to the anchor post of the subsea structure.

28. A subsea assembly as described in any of clauses 18 to 24, wherein:
the header pipe joint is connected inline of a pipeline;
the subsea structure comprises a support having a carrier slidably received therein for receiving the header pipe joint; the axial position of the header pipe joint being adjustable by sliding the carrier.

29. A subsea assembly as described in any of clauses 18 to 28, wherein the header pipe joint is connected inline of a spool or pipeline by welding or bolting.

30. A subsea assembly as described in any of clauses 18 to 29, wherein the header pipe joint is connected inline of a spool, and the spool is connected inline of a pipeline.

31. A method of installing a manifold at a subsea structure, comprising:
providing a manifold having a spool integrally connected therewith;
lowering the manifold having the spool integrally connected therewith to the subsea structure; and
fluidically connecting the manifold with the subsea structure to thereby provide a fluidic connection between the spool and the subsea structure.

32. A method as described in clause 31, wherein the manifold is integrally connected to the spool by a welded connection or a flange, preferably a compact flange.

33. A method as described in clause 31 or 32, wherein the spool comprises two spool pieces, each spool piece being integrally connected to the manifold by a welded connection or flange, preferably a compact flange.

34. A method as described in any of clauses 31 to 33, wherein the manifold comprises a header pipe and wherein the spool is integrally connected with the header pipe of the manifold, preferably by a welded connection or a flange, preferably a compact flange.

35. A method as described in clause 34, wherein:
the manifold further comprises branch piping;
at least one valve is provided in the header pipe or branch piping;
wherein the branch piping and the header pipe are connected via the valve.

36. A method as described in clause 35, wherein the step of fluidically connecting the manifold with the subsea structure comprises connecting the branch piping with the subsea structure to thereby provide a fluidic connection between the spool and the subsea structure via the header pipe, valve and branch piping.

37. A method as described in any of clauses 31 to 36, wherein the subsea structure comprises a subsea production system, preferably an xmas tree, riser base, pump or compressor station.

38. A method as described in clause 37, wherein the step of fluidically connecting the manifold with the subsea structure comprises connecting branch piping of the manifold with the xmas tree, riser base, pump or compressor station.

39. A method of connecting a subsea pipeline to a subsea structure, comprising installing a manifold at the subsea structure as described in any of clauses 31 to 38, the method further comprising connecting the spool to the subsea pipeline.

The invention claimed is:

1. A method of installing a manifold at a subsea structure, comprising: providing a manifold having a spool integrally connected therewith; lowering the manifold having the spool integrally connected therewith to the subsea structure; fluidically connecting the manifold with the subsea structure to thereby provide a fluidic connection between the spool and the subsea structure; and fluidically connecting the spool to a subsea pipeline to thereby provide a fluidic connection between the subsea structure and the subsea pipeline, wherein the spool comprises a connector configured to connect to a connector on the subsea pipeline, wherein the spool comprises two spool pieces, wherein one spool piece is provided on one side of the manifold, and the other spool piece is on the other side of the manifold, the spool pieces configured to facilitate the connection of the manifold inline of a pipeline.

2. The method of claim 1, wherein the manifold is integrally connected to the spool by a welded connection or a flange.

3. The method of claim 2, wherein the flange is a compact flange.

4. The method of claim 1, wherein the spool comprises one or two spool pieces, the or each spool piece being integrally connected to the manifold by a welded connection or flange.

5. The method of claim 4, wherein the flange is a compact flange.

6. The method of claim 1, wherein the manifold comprises a header pipe and wherein the spool is integrally connected with the header pipe of the manifold.

7. The method of claim 6, wherein the spool is integrally connected with the header pipe by a welded connection.

8. The method of claim 6, wherein the spool is integrally connected with the header pipe by a flange.

9. The method of claim 8, wherein the flange is a compact flange.

10. The method of claim 6, wherein:
the manifold further comprises branch piping;
at least one valve is provided in the header pipe or branch piping;
wherein the branch piping and the header pipe are connected via the valve.

11. The method of claim 10, wherein the step of fluidically connecting the manifold with the subsea structure comprises connecting the branch piping with the subsea structure to thereby provide a fluidic connection between the spool and the subsea structure via the header pipe, valve and branch piping.

12. The method of claim 1, wherein the subsea structure comprises a subsea production system.

13. The method of claim 12, wherein the subsea production system comprises an xmas tree.

14. The method of claim 12, wherein the subsea production system comprises a riser base.

15. The method of claim 12, wherein the subsea production system comprises a pump.

16. The method of claim 12, wherein the subsea production system comprises a compressor station.

17. The method of claim 12, wherein the step of fluidically connecting the manifold with the subsea structure comprises connecting the branch piping of the manifold with the xmas tree, riser base, pump or compressor station.

18. A method of connecting a subsea pipeline to a subsea structure, comprising installing a manifold at the subsea structure according to the method as claimed in claim 1, the method further comprising connecting the spool to the subsea pipeline.

19. A method of connecting a subsea pipeline to a subsea structure, comprising installing a manifold at the subsea structure according to the method as claimed in claim 1, wherein the spool comprises two spool pieces, the method comprising connecting each spool piece to the pipeline such that the manifold is inline of the pipeline.

* * * * *